US006944848B2

(12) United States Patent
Hartman et al.

(10) Patent No.: US 6,944,848 B2
(45) Date of Patent: Sep. 13, 2005

(54) TECHNIQUE USING PERSISTENT FOCI FOR FINITE STATE MACHINE BASED SOFTWARE TEST GENERATION

(75) Inventors: Alan Hartman, Haifa (IL); Kenneth Nagin, Nazareth Illit (IL); Paul Kram, Lowell, MA (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 09/847,309

(22) Filed: May 3, 2001

(65) Prior Publication Data

US 2003/0014734 A1 Jan. 16, 2003

(51) Int. Cl.$^7$ ................................................ G06F 9/44
(52) U.S. Cl. ...................................................... 717/124
(58) Field of Search ........................... 717/124; 714/25, 714/37, 39

(56) References Cited

U.S. PATENT DOCUMENTS

| | | | | |
|---|---|---|---|---|
| 4,991,176 A | | 2/1991 | Dahbura et al. | |
| 5,394,347 A | | 2/1995 | Kita et al. | |
| 5,452,457 A | * | 9/1995 | Alpert et al. | 717/153 |
| 5,530,964 A | * | 6/1996 | Alpert et al. | 717/158 |
| 5,623,499 A | | 4/1997 | Ko et al. | |
| 5,651,111 A | * | 7/1997 | McKeeman et al. | 714/38 |
| 5,828,824 A | * | 10/1998 | Swoboda | 714/25 |
| 5,918,037 A | | 6/1999 | Tremblay et al. | |
| 6,016,555 A | * | 1/2000 | Deao et al. | 714/35 |
| 6,065,106 A | * | 5/2000 | Deao et al. | 712/24 |
| 6,112,312 A | * | 8/2000 | Parker et al. | 714/32 |
| 6,115,746 A | * | 9/2000 | Waters et al. | 709/229 |
| 6,484,135 B1 | * | 11/2002 | Chin et al. | 703/23 |
| 6,505,342 B1 | * | 1/2003 | Hartmann et al. | 717/104 |
| 6,574,578 B1 | * | 6/2003 | Logan | 702/122 |
| 6,601,018 B1 | * | 7/2003 | Logan | 702/186 |

OTHER PUBLICATIONS

"Test Environment Toolkit" TETware User Guide Revision 1.2 TET3–UG–1.2, The Open Group Released Sep. 18, 1998, pp. 1–116.*
"Test Environment Toolkit" Release Notes for TETware Release 3.3, TET3–RN–3.3, The Open Group Released Sep. 18, 1998, pp. 1–8.*
"Test Environment Toolkit" TETware Programmer's Guide Revision 1.2 TET3–PG–1.2, The Open Group Released Sep. 18, 1998, pp. 1–258.*
"Automated Test Generation from a Behavioral Model", James M. Clarke, Lucent Technologies, May 1998.*
"Web Programming Guide", Lotus Development Corporation, release 4.6.1, 1997.*
"Automatically Tracking Test Case Execution", Neil Hunt, Rational Corporation, 2001.*
"JUNIT Test Patterns in Rational XDE", Frank Hagenson, IP Sentry, pp. 1–19, 2003.*
"Apache Module mod_setenvit", Apache HTTP Server Version 2.0, IBM website No Date.*
"Validation of Turandot, a Fast Processor Model for Microarchitecture Exploration", Mayan Moudgill et al, IBM, pp. 1–16, Feb. 11, 1999.*
The XML Handbook, C. Goldfarb et al, pp. 1–18, 1998.*
I. Gronau et al., "A Methodology and Architecture for Automated Software Testing", IBM Research Laboratory in Haifa Technical Report, 17 pages, Oct. 2000, Haifa, Israel.
"Murphi Description Language and Verifier", previously overviewed in "Protocol Verification as a Hardware Design Aid", by D.L. Dill et al., *1992 IEEE International Conference on Computer Design: VSLI in Computers and Processors, IEEE Computer Society*, pp. 522–525, and last updated May 1996, 5 pages. (http://sprout.stanford.edu/dill/murphi/html).
Ilan Gronau, et al., "Methodology and architecture for automated software testing", Jan. 11, 2000. (http://www-.geocities.com/model_based_testing//online_papers.htm).
Brian Marick, "The craft of software testing", 1995, Chap. 5, p. 132.
Boris Beizer, "Software testing techniques", Second Edition, 1990, pp. 23–24.
R. Burke, "Black–box regression testing—an automated approach", Fifth International Conference on Testing Computer Software, Washington, DC, Jun. 1988 (pp. 455, 481 in Boris Beizer's Book "Software testing techniques", Second Edition, 1990.

* cited by examiner

*Primary Examiner*—Todd Ingberg
(74) *Attorney, Agent, or Firm*—McGuireWoods LLP; Daniel Kligler

(57) ABSTRACT

A system for automatic generation of test programs employs test generation foci linked to a finite state machine behavioral model of a software application under test to produce abstract test suites that are executed by an execution engine. The foci include directive expressions that tag coverage variables of the behavioral model. The execution engine operates until the tagged coverage variables have assumed all their possible values. Both the behavioral models and the foci are archivable and can be retrieved and reused independently.

81 Claims, 7 Drawing Sheets

TECHNIQUE USING PERSISTENT FOCI FOR FINITE STATE MACHINE BASED SOFTWARE TEST GENERATION

BACKGROUND OF THE INVENTION

1. Field of the Invention

This invention relates to software testing. More particularly this invention relates to the automatic generation of test programs for a software implementation that has been modeled as a finite state machine.

2. Description of the Related Art

In the field of hardware, testing it is common to treat the device under test as a finite state machine (FSM). It has been proposed to similarly automate software testing by similarly representing the software program as a finite state machine, in which transitions are represented as directed edges between states. However, the number of tests required to exhaustively exercise a software program is typically much larger than is required for hardware. Furthermore resources for test execution are limited, and their use constitutes a cost. Accordingly, test engineers have attempted to selectively reduce the number of tests in order that the test generation process be practical in terms of cost and execution time, recognizing that the testing process must still be reliable. Explosion of the number of test programs that are generated by automatic techniques is a drawback of automatic test program generation.

Test engineers use finite state machines to model externally observable behavior, and then use various tools to traverse paths of test actions that connect a sequence of states They then generate test cases for a variety of purposes, for example acceptance suites, full functional test suites, and regression test suites. Regression test suites involve a rerun of selected portions of a test suite following a revision of an application.

Because a finite state machine that reflects the specification of a useful software program is typically very large, various approaches have been taken to manage the model, using concise and powerful graphical and textual languages. Various traversal algorithms are applied to the finite state machine for test generation. These algorithms are parameterized by the test engineer at runtime.

The generation of an astronomical number of possible test cases is a well-known software testing problem, which has been exacerbated by the speed of automated test generation. Test engineers deal with this by identifying "equivalence classes" for various attributes of test cases. For example, for a function call argument that must fall within the range of 1 to 5, a test engineer may decide to test the minimum value (1), the maximum value (5), and one value that falls between the minimum and the maximum, such as the value (2). With these decisions, the test engineer places the values (2), (3), and (4) in an "equivalence class". Each value is considered equivalent to the other two, in the sense that if the test fails for any value in the class, then it will fail for all other values of the class. The recognition of equivalence classes stems from the recognition of inherent properties of the software being tested. In theory, there is one "true" set of equivalence classes for a particular program. Once these classes are correctly ascertained, they will remain static throughout the testing period, or until the software application under test is significantly changed.

Conventional approaches to test generation have common problems that this invention builds upon. In each case, the number of unique paths, or generated test programs is an exponential function of the number of modeled states and transitions. Thus as the scope of the modeled behavior grows, the time to exhaustively generate test cases, and more significantly, the time needed to execute the generated test cases grows exponentially. This growth places a practical limit on the complexity of the program behavior to which automated test generation can be applied. The invention focuses and therefore reduces the number of tests to a practical level. In so doing, the invention raises the practical limit on the complexity of the software program to which automated test generation may be applied.

A common test planning heuristic is "suspicion testing", in which "suspected" features of the program are evaluated. For example, aspects of the program that are inherently difficult to implement are suspected to have a relatively high probability of containing defects.

In other approaches, constraints have been imposed on paths or transitions, and if not satisfied, the path would not be tested further.

Typical of prior art approaches for generating test programs is U.S. Pat. No. 5,394,347 to Kita et al. which discloses a method of modeling a specification as an extended finite state machine, then performing a depth-first traversal of the resulting state diagram to generate a path file as a basis for a test program.

U.S. Pat. No. 5,623,499 to Ko et al. discloses a technique for generating a test data sequence of minimal length, employing an extended finite state machine. This technique attempts to balance the number of traversals of the directed edges in order to test values in a predetermined test data set. The test data sequence is constructed using an Euler tour.

In U.S. Pat. No. 5,918,037 to Tremblay et al., it is proposed to employ a test generator that automatically produces test programs based on a finite state machine model of the software. Limiting the number of test programs is achieved by controlling loop execution, and by appropriately setting the coverage level for the model, known as "transition cover testing". This approach seeks to specify during the test program generation process that each transition within the finite state machine model be exercised once. The generator is capable of specifying different coverage levels for selected portions of the program under test, so that critical portions might be exhaustively tested, while other portions receive less comprehensive testing.

There are several reasons for focusing test program generation. Some may be unanticipated during the development and implementation of the software specification. For example, the testing process may uncover programming defects. Such discovery may create the need to generate still more tests that work around the newly discovered defect in order to test unaffected parts of the software. Once the defect has been corrected, even more tests may need to be generated in order for verification. In practice, a supposedly corrected defect may surface again following subsequent program modification, or changes in the conditions of usage. Thus, it is desirable to repeatedly verify that the defect has not recurred.

The task has fallen to software engineers to revise test programs to accommodate incremental changes in the software program. As there is a cost in the generation of test models, engineers archive and reuse the products of the test generation process. While the archival technique is generally practical, maintaining compatible archived test programs has itself been proven costly. Furthermore, ad hoc practices of cataloging, finding, and retrieving combinations of test generation parameters are impractical. Because of the lack of alternatives, test engineers often are compelled to resort to archiving entire test suites, which is relatively costly.

It would be desirable to be able to automatically create test programs directed at narrowed targets in a manner that allows more compact archival of data objects that can be readily retrieved and reused when it becomes necessary to retest a software application, or for use in testing different software applications.

SUMMARY OF THE INVENTION

It is a primary advantage of some aspects of the present invention that a technique of software test generation is provided wherein a practical, limited number of tests programs are generated.

It is an another advantage of some aspects of the present invention that the targets of the test generation programs are narrowly focused.

It is yet another advantage of some aspects of the present invention that objects employed in the system of software test generation are archivable and reusable in the testing of multiple software applications.

It is a further advantage of some aspects of the present invention that changes in the software program can be accommodated by automatically detecting those objects employed in the system of software test generation which require revision.

These and other advantages of the present invention are attained by a system for automatic generation of test programs that employs test generation foci linked to a finite state machine behavioral model of a software application under test. The foci and the behavioral model provide the input of a test generator that produces abstract test suites that are executed by an execution engine. The foci include directive expressions that tag coverage variables of the behavioral model. The execution engine operates until the tagged coverage variables have assumed all their possible values. Both the behavioral models and the foci are archivable and can be retrieved and reused independently.

This invention applies to all parameterized test generation algorithms. All known approaches using the finite state machine utilize the states of the program as a set of variables with values assigned. Aspects of the invention that relate to state variables of behavioral models are broadly applicable to all known methods employing finite state machine modeling and test generation techniques that use state variables.

The invention provides a method for testing computer software, which includes modeling a software application as a finite state machine to define a behavioral model, and associating the behavioral model with a focus. The focus has a reference to the behavioral model, and has at least one directive. The method further includes generating a test program according to state transitions of the behavioral model and the directive of the focus.

According to an aspect of the method, the directive is a model independent directive.

According to yet another aspect of the method, the directive is a model dependent directive, and a coverage variable of the behavioral model is tagged by a tag of the model dependent directive.

According to an aspect of the method, the test program references the coverage variable, and generating the test program is performed until the coverage variable has assumed each of its allowable values.

According to still another aspect of the method, the coverage variable is a plurality of coverage variables, and generating the test program is performed until a cross product of the coverage variables has assumed all possible values thereof.

According to an additional aspect of the method, generating the test program is performed until an orthogonal array of the coverage variables has assumed all possible values thereof.

According to yet another aspect of the method, the model dependent directive is a plurality of model dependent directives, and the coverage variable is tagged by a plurality of tags of the model dependent directives.

According to an additional aspect of the method, the tag is a number-of-tests-per-value tag.

According to an aspect of the method, the model dependent directive is a mask-value directive.

According to yet another aspect of the method, the directive includes a plurality of directives that are combined to define a directive expression, wherein generating the test program is performed until the directive expression has a predetermined value.

According to an aspect of the method, modeling is performed by retrieving the behavioral model from a model archive.

According to still another aspect of the method, the behavioral model is associated with a focus by retrieving the focus from a focus archive.

Another aspect of the method includes comparing state variables of foci of the focus archive with state variables of the behavioral model, and responsive to comparisons resulting from the comparison, revising selected ones of the foci.

The invention provides a computer software product, which includes a computer-readable medium in which computer program instructions are stored, which instructions, when read by a computer, cause the computer to execute a method of test generation for testing computer software. The method includes accepting as a first input a behavioral model of a software application, wherein the behavioral model includes a finite state machine, accepting as a second input a focus that has a reference to the behavioral model, and has at least one directive, associating the behavioral model with the focus, and generating a test program according to state transitions of the behavioral model and the directive of the focus.

According to an aspect of the software product, the directive is a model independent directive.

According to yet another aspect of the software product, the directive is a model dependent directive, and a coverage variable of the behavioral model is tagged by a tag of the model dependent directive.

According to an aspect of the software product, the test program references the coverage variable, and generating the test program is performed until the coverage variable has assumed each of its allowable values.

According to still another aspect of the software product, the coverage variable is a plurality of coverage variables, and generating the test program is performed until a cross product of the coverage variables has assumed all possible values thereof.

According to an additional aspect of the software product, generating the test program is performed until an orthogonal array of the coverage variables has assumed all possible values thereof.

According to yet another aspect of the software product, the model dependent directive is a plurality of model dependent directives, and the coverage variable is tagged by a plurality of tags of the model dependent directives.

According to an additional aspect of the software product, the tag is a number-of-tests-per-value tag.

According to an aspect of the software product, the model dependent directive is a mask-value directive.

According to yet another aspect of the software product, the directive includes a plurality of directives that are combined to define a directive expression, wherein generating the test program is performed until the directive expression has a predetermined value.

According to an aspect of the software product, modeling is performed by retrieving the behavioral model from a model archive.

According to still another aspect of the software product, the behavioral model is associated with a focus by retrieving the focus from a focus archive.

Another aspect of the software product includes comparing state variables of foci of the focus archive with state variables of the behavioral model, and responsive to comparisons resulting from the comparison, revising selected ones of the foci.

The invention provides a method of test generation for testing computer software, which includes modeling a software application as a finite state machine to define a behavioral model, associating the behavioral model with a focus, the focus having a reference to the behavioral model, and having at least one directive, deriving an abstract test suite from the behavioral model and the focus, wherein the abstract test suite complies with a test constraint that is encoded in the focus, and executing the abstract test suite in an execution engine.

According to an aspect of the method, executing the abstract test suite includes generating a test script from the abstract test suite, wherein the test script is executed in the execution engine.

According to an additional aspect of the method, producing the abstract test suite is performed with a testing interface. The testing interface can include an abstract-to-concrete translation table.

According to a further aspect of the method, the testing interface includes a test driver, an operator interface, and producing the test suite further includes varying parameters of the test driver via the operator interface in accordance with requirements of the software application.

According to another aspect of the method, the directive is a model independent directive.

According to an additional aspect of the method, the coverage variable includes a plurality of coverage variables, and generating the test script is performed until the cross product of the coverage variables has assumed all possible values thereof.

According to another aspect of the method, generating the test script is performed until an orthogonal array of the coverage variables has assumed all possible values thereof.

According to a further aspect of the method, the directive is a model dependent directive, and a coverage variable of the behavioral model is tagged by a tag of the model dependent directive.

According to still another aspect of the method, the abstract test suite references the coverage variable, and the generating the test script is performed until the coverage variable has assumed each of its allowable values.

According to yet another aspect of the method, the directive is model independent directive.

According to an aspect of the method, the model dependent directive includes a plurality of model dependent directives, and the coverage variable is tagged by a plurality of tags of the model dependent directives.

According to another aspect of the method, the tag is a number-of-tests-per-value tag.

According to a further aspect of the method, the model dependent directive is a mask-value directive.

According to yet another aspect of the method, the directive includes a plurality of directives that are combined to define a directive expression, wherein generating the test script is performed until the directive expression has a predetermined value.

According to an additional aspect of the method, modeling is performed by retrieving the behavioral model from a model archive.

According to an aspect of the method, associating the behavioral model is performed by retrieving the focus from a focus archive.

Another aspect of the method includes comparing state variables of foci of the focus archive with state variables of the behavioral model, and responsive to the comparisons, revising selected ones of the foci.

The invention provides a computer software product for testing computer software, including a computer-readable medium in which computer program instructions are stored, which instructions, when read by a computer, cause the computer to perform a method which includes associating a behavioral model of a software application with a focus. The focus has a reference to the behavioral model, has at least one directive, and the behavioral model models a finite state machine. The method further includes deriving an abstract test suite from the behavioral model and the focus, wherein the abstract test suite complies with a test constraint that is encoded in the focus, and executing the abstract test suite in an execution engine.

According to an aspect of the software product, executing the abstract test suite includes generating a test script from the abstract test suite, wherein the test script is executed in the execution engine.

According to an aspect of the software product, producing the abstract test suite is performed with a testing interface.

According to another aspect of the software product, the testing interface includes an abstract-to-concrete translation table.

According to a further aspect of the software product, the testing interface includes a test driver, an operator interface, and the method includes varying parameters of the test driver via the operator interface in accordance with requirements of the software application.

According to yet another aspect of the software product, the directive is a model independent directive.

According to an aspect of the software product, the directive is a model dependent directive, and a coverage variable of the behavioral model is tagged by a tag of the model dependent directive, the coverage variable has allowable values.

According to an additional aspect of the software product, the coverage variable includes a plurality of coverage variables, and generating the test script is performed until a cross product of the coverage variables has assumed all possible values thereof.

According to a further aspect of the software product, the coverage variable includes a plurality of coverage variables, and generating the test script is performed until an orthogonal array of the coverage variables has assumed all possible values thereof.

According to still another aspect of the software product, the abstract test suite references the coverage variable, and generating the test script is performed until the coverage variable has assumed each of the allowable values.

According to a further aspect of the software product, the model dependent directive includes a plurality of model dependent directives, and the coverage variable is tagged by a plurality of tags of the model dependent directives.

According to yet another aspect of the software product, the tag is a number-of-tests-per-value tag.

According to still another aspect of the software product, the model dependent directive is a mask-value directive.

According to an additional aspect of the software product, the directive includes a plurality of directives that are combined to define a directive expression, and generating the test script is performed until the directive expression has a predetermined value.

According to an aspect of the software product, modeling is performed by retrieving the behavioral model from a model archive.

According to another aspect of the software product, associating is performed by retrieving the focus from a focus archive.

A further aspect of the software product includes comparing state variables of foci of the focus archive with state variables of the behavioral model, and responsive to the comparisons, revising selected ones of the foci.

The invention provides a computer system for testing computer software, which includes a user interface for creating a behavioral model of a software application. The behavioral model represents a finite state machine, wherein the user interface creates a focus. The focus has a reference to the behavioral model, and has at least one directive, The system further includes a compiler, for converting the behavioral model into an intermediate encoding thereof, a test generator, accepting the intermediate encoding and the focus as input, and producing an abstract test suite, and an execution engine for executing a test program of the abstract test suite.

According to an aspect of the system, the execution engine produces a suite execution trace.

Another aspect of the system includes an analyzer, which reads the suite execution trace, and the execution engine accepts an output of the analyzer.

Yet another aspect of the system includes a visualizer for visualizing an output of the execution engine.

According to an additional aspect of the system, the execution engine receives input from an application model interface that is created by the user interface.

According to still another aspect of the system, the directive is a model independent directive.

According to another aspect of the system, the directive is a model dependent directive, and a coverage variable of the behavioral model is tagged by a tag of the model dependent directive.

According to yet another aspect of the system, the test program references the coverage variable, and the test generator operates until the coverage variable has assumed each of the allowable values.

According to still another aspect of the system, the coverage variable includes a plurality of coverage variables, and the execution engine executes until a cross product of the coverage variables has assumed all possible values thereof.

According to yet another aspect of the system, the execution engine executes until an orthogonal array of the coverage variables has assumed all possible values thereof.

According to an additional aspect of the system, the model dependent directive includes a plurality of model dependent directives, and the coverage variable is tagged by a plurality of tags of the model dependent directives.

According to an aspect of the system, the tag is a number-of-tests-per-value tag.

According to another aspect of the system, the model dependent directive is a mask-value directive.

According to a further aspect of the system, the directive includes a plurality of directives that are combined to define a directive expression, wherein the execution engine executes until the directive expression has a predetermined value.

Yet another aspect of the system includes a model archive that is accessed by the user interface.

Still another aspect of the system includes a focus archive that is accessed by the user interface.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well known circuits, control logic, and the details of computer program instructions for conventional algorithms and processes have not been shown in detail in order not to unnecessarily obscure the present invention.

Software programming code, which embodies the present invention, is typically stored in permanent storage of some type, such as a computer readable medium. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

As used herein, a "test suite" is a collection of test programs for use in testing a software application.

General Methodology.

Figure 1:
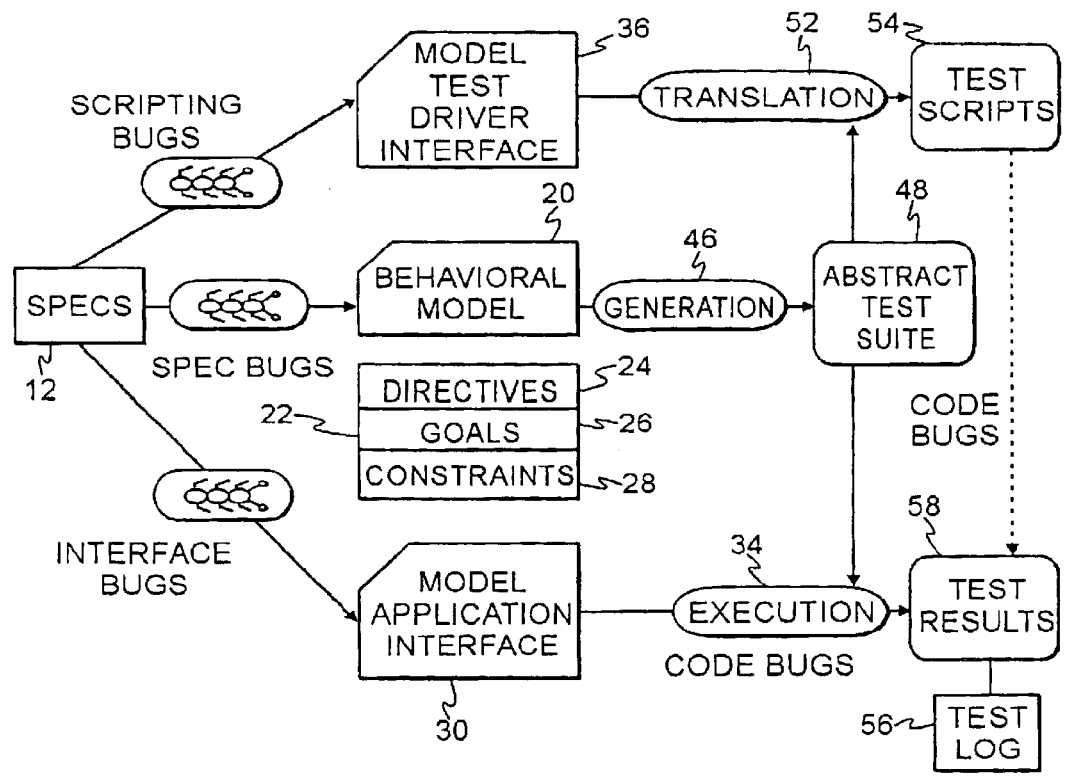
FIG. 1 is a block diagram of a technique for automatic software testing in accordance with the invention.

Turning now to the drawings, and to FIGS. 1 and 2 thereof, the general method 10 of automated software testing is employed in conjunction with certain modifications according to a preferred embodiment of the invention, as will be disclosed in further detail hereinbelow.

Software specifications 12 provide the starting point for the general method 10 at step 14. The specifications 12 are evaluated at step 16. Execution then proceeds to the step 18, in which a behavioral model 20 of the software application is constructed in some formal language, based on the specifications 12. The behavioral model 20 is specified as a finite state machine. Such machines are well known in the art and are disclosed, for example, in the above noted U.S. Pat. No. 5,918,037. The behavioral model 20 may comprise a plurality of finite state machines.

The behavioral model 20 is associated with a focus, which is a data object 22 that includes testing directives 24, descriptions of the coverage goals 26, and test constraints 28, as may be required by a particular test suite. Preferably, the behavioral model 20, and the data object 22 are stored in separate files for ease of management, and separation of function. Thus, the behavioral model 20 could be associated with directives and test constraints that differ from the directives 24 and the test constraints 28 in order to generate different test suites of a software application for different purposes. Regression suites, acceptance suites, and full functional test suites could be produced using the behavioral model 20.

Following construction of the behavioral model 20, a testing interface 30 is created at step 32. The testing interface 30 is separate from the behavioral model 20 and the test execution engine 34 that actually executes the test programs. Functionally the testing interface 30 provides a connection between concepts and abstractions that are embodied in the behavioral model 20, and the requirements of the test execution engine 34. In practice, a software application may already be provided with an existing test execution engine, and the testing interface 30 is prepared by coding an abstract-to-concrete (A2C) test translation table. The testing interface 30 employs an abstract-to-concrete translation algorithm, which can be written in any convenient programming language to produce actual test scripts and verification code. Alternatively, test suites can be executed using a generic test driver with an appropriate test driver interface 36 that may include customization to meet the requirements of the software application under test. It is common for established software products to have customized test drivers, which can be adapted for use in accordance with the invention. It is an essential phase in the general method 10 that the behavioral model 20 and the testing interface 30 be reviewed by the testers, architects, and developers of the software application under test. This review, conducted in step 38, is intended to discover inaccuracies, omissions, and contradictions in the specifications 12. The review of step 38 also can reveal problems related to the design and specification of the testing interface 30. Such interface defects are similar to those that would be encountered by an end-user or programmer while writing an application or component, which interacts with the software application under test. An additional benefit of the review of step 38 is the discovery of defects resulting from imperfect communication between members of the development team for the software application under test, and the team charged with testing the software. It has been found that detection of these defects significantly reduces maintenance costs that may be required later in the product life cycle.

At decision step 40 it is determined whether defects in the testing interface 30 have been revealed in step 38. If so, control returns to step 32. Otherwise, at decision step 42 it is determined whether defects in the specifications 12 or the behavioral model 20 have been revealed in step 38. If so, then control returns to step 16 or step 18 as appropriate.

If no defects have been revealed in an iteration of step 38, then execution proceeds to step 44, where a formal test generation tool 46 generates abstract test suites 48. The abstract test suites 48 cover specified aspects of the behavioral model 20, and satisfy the test constraints 28. The test constraints 28 are realized as objects known as foci, which are disclosed in further detail hereinbelow. The test generation tool 46 reports any coverage tasks that cannot be covered by a test that satisfies the test constraints 28. It has been found that such tasks are indicative of defects in the behavioral model 20. For example, they could indicate that the test constraints 28 are excessively narrow. However, they also could indicate defects in the specifications 12.

In step 50 the abstract test suites 48 are submitted to a translator 52 which prepares test scripts 54 for execution by the test execution engine 34. The test execution engine 34 can execute the abstract test suites 48 directly, using the software application under test. The results include a test log 56, that records the test execution, and compares the outcome of each step in the test with the outcome predicted by the behavioral model 20. In some embodiments the test execution engine 34 simulates the software application under test, using stimuli provided from the abstract test suites 48 that are generated from the behavioral model 20.

Evaluation of the test results 58 that are produced in step 50 is accomplished in step 60. If defects are found, then the process iterates, and control returns to step 16. If necessary, modifications are made to the behavioral model 20, the directives 24, or the runtime parameters of the test generation tool 46. More abstract test suites can then be generated in order to improve the effectiveness of the test. Most coding and design defects are expected to be discovered during step 60.

It has been found in practice that several test suites and several distinct behavioral models can be used to test the same software application, each of the test suites exposing a different set of defects.

If no defects are discovered in step 60, then the process ends at termination step 62.

System Architecture.

Figure 2:
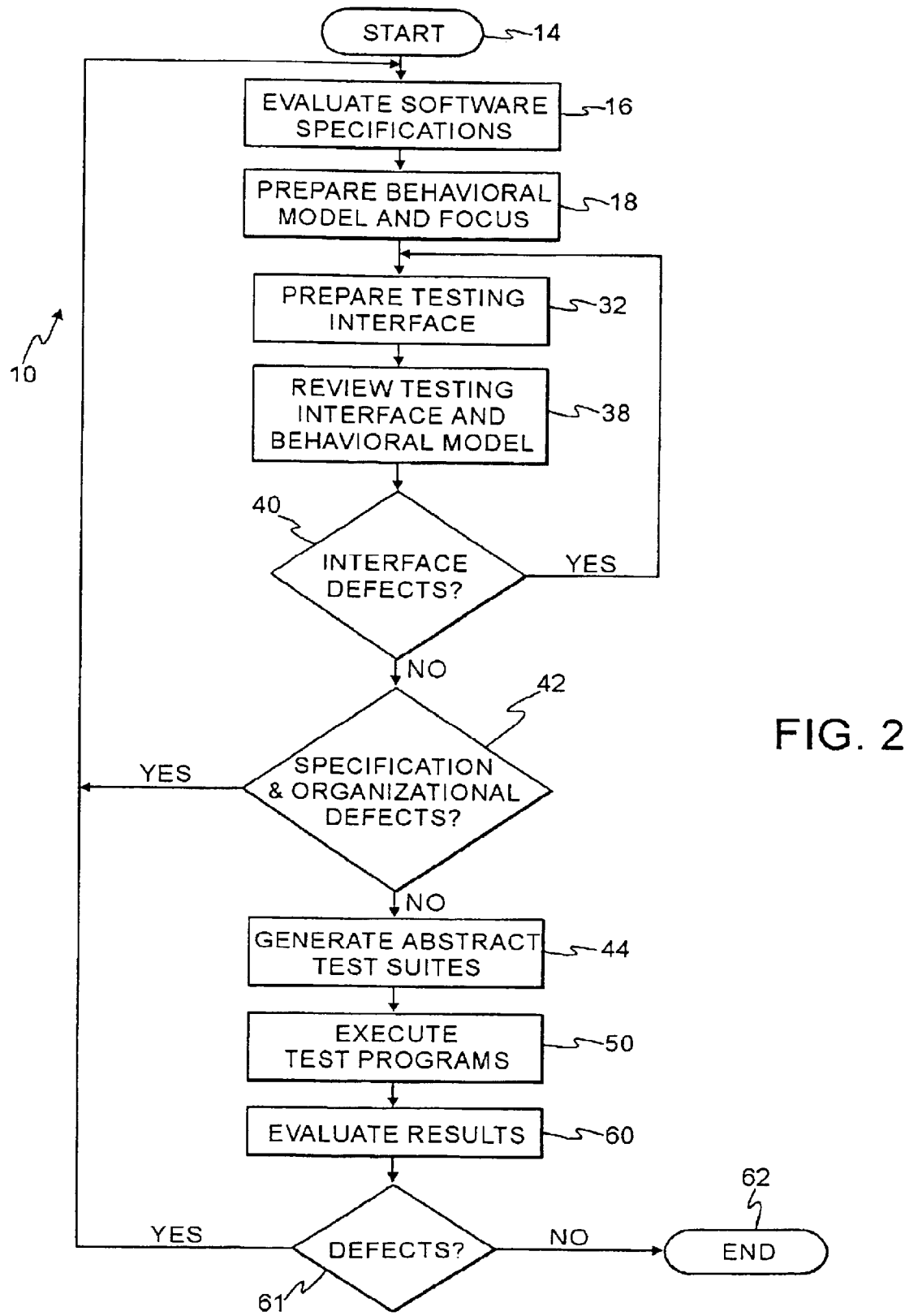
FIG. 2 is a flow chart illustrating a method of automatic software testing according to a preferred embodiment of the invention.
Figure 3:
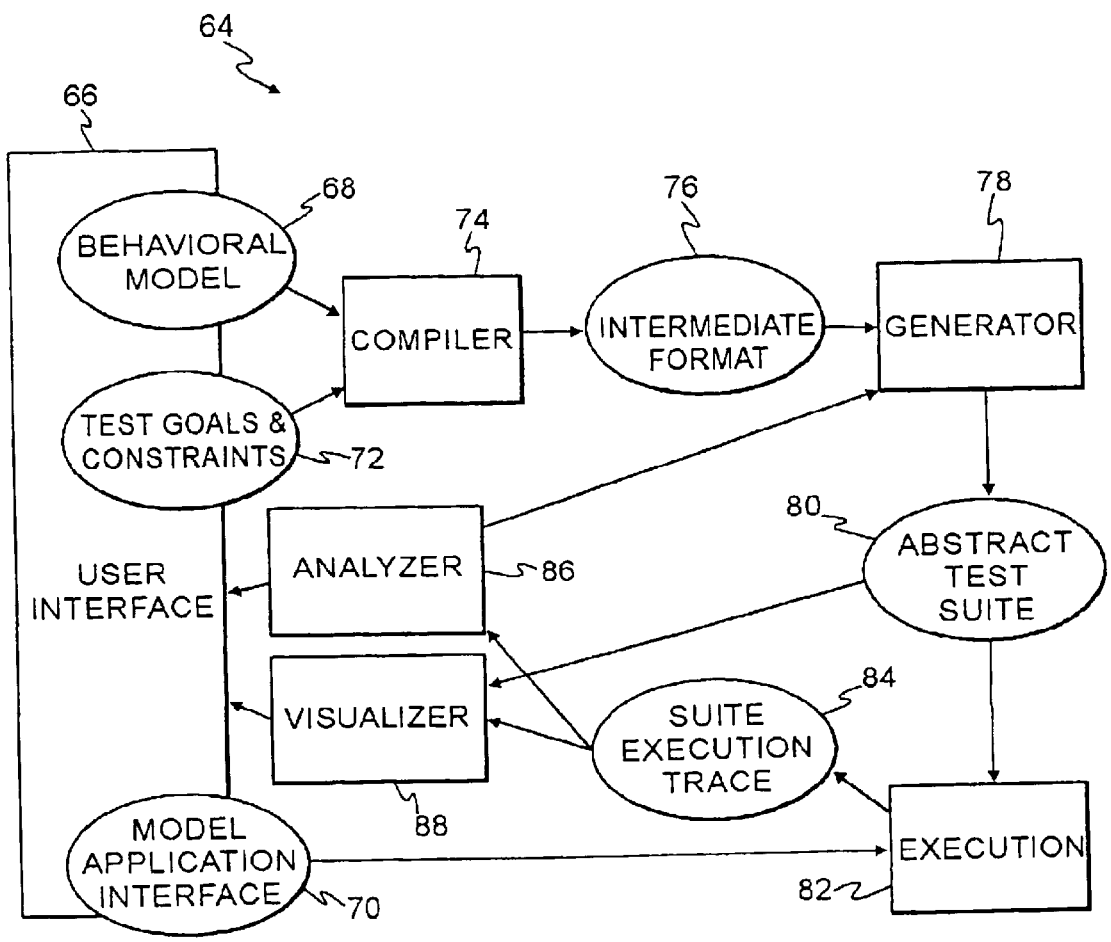
FIG. 3 is a block diagram illustrating the architecture of a system for automatically testing software in accordance with the invention.

The architecture of an automated software testing system that is suitable for use with the method illustrated in FIG. 2 is explained in further detail with reference to FIG. 3. The system 64 is designed for open participation and includes interchangeable components, which can be developed and implemented as necessary for a particular software application. The system 64 can be used with various modeling languages, including the languages SDL, Z, CSP, UML, Murphi, Spin, and others. The system 64 permits the reuse of existing testing frameworks and execution engines.

A user interface 66 is preferably employed to create a suitable behavioral model 68, an application model interface 70, and a collection 72 of test goals and test constraints. The test constraints of the collection 72 are foci. The user interface 66 includes suitable editors for the behavioral model 68, the testing goals and constraints, or foci, of the collection 72, and the model interface 70, with activators for these tools, and applications for viewing their outputs. It is possible to create the behavioral model 68 and the model interface 70 without the benefit of the editors of the user interface 66, but the process is more tedious. In some embodiments, the behavioral model 68 can be retrieved from an archive of behavioral models.

A compiler 74 converts the behavioral model 68, into an intermediate format 76 of the behavioral model 68 and its testing directives, which are foci. The intermediate format 76 is an encoding of a finite state machine, which describes the behavior of the software application under test, the coverage goals of the test suite, and the restrictions imposed by testing constraints.

The intermediate format 76 can be a C++ source file that contains classes describing the state variables, methods for computing the set of all next states from a given state in the finite state machine, methods for generating all start states, methods for computing the test constraints, and methods to analyze the states in terms of the coverage directives. The intermediate format 76 is compiled and linked together with test generator code, to produce a model-specific test generator 78. Preferably, the test generator code is written in a high performance software language such as C, C++, or assembler.

The test generator 78 can be used with different realizations of the compiler 74, and produces an abstract test suite 80. In prototypes, the test generator 78 has been successfully used with models written in languages based on both Objective VHDL and Murphi. It is possible to substitute different versions of the test generator 78 into the system 64. Thus, a plurality of test generators can act sequentially in the role of the test generator 78, and can produce different versions of the abstract test suite 80.

The abstract test suite 80 can be in XML format, or in any of the standard languages for test case specification, including TTCN, the ITU standard for test suites in the telecommunications area. It includes elements describing the set of all state variables, and their ranges. The abstract test suite 80 also includes elements describing the set of all possible inputs to the state machine. It will be appreciated that these inputs are stimuli for the software application under test. Also included in the abstract test suite 80 is the set of all test cases in the suite, each of which consists of a sequence of transitions. Each transition includes an input, or stimulus, followed by the state entered by the model after response to the stimulus.

An execution engine 82 reads the abstract test suite 80, along with test interface objects that are produced in the model interface 70. The execution engine 82 is a set of Java classes, which must be customized for the software application under test by coding a set of methods. These methods include a method for each stimulus to the software application under test, a method to query the values of the software artifacts that correspond to the state variables, and a method to instantiate verification logic, which compares the state predicted by the behavioral model 68 with the observed state of the software application under test.

Each stimulus for each transition is presented by the execution engine 82 to the software application under test. The execution engine 82 then queries the state of the software application under test, applying the customized verification logic. The response to the stimulus and the verification by the execution engine 82 are written to a suite execution trace 84 in a standard form accessible to existing productivity tools including an analyzer 86 and a visualizer 88.

The suite execution trace 84 and the abstract test suite 80 produce large amounts of data, which are generally difficult for the human operator to assimilate. The visualizer 88 is capable of showing data produced by both the suite execution trace 84 and the abstract test suite 80 in a visually informative way. It has been found that a tree representation of the abstract test suite 80 is particularly useful to the operator. Color codes indicate the success or failure of a particular member of the abstract test suite 80, test case, or transition. The visualizer 88 is constructed to permit additional levels of detail to be visualized, using a mouse interface. Other tools of the visualizer 88 provide statistical summaries, and enable the creation of bar charts, histograms, and graphs displaying various aspects of the abstract test suite 80 and the suite execution trace 84.

The analyzer 86 is capable of reading the suite execution trace 84 and identifying areas of the behavioral model 68 that may not have been covered sufficiently. The analyzer 86 provides input to the test generator 78 in order to develop additional test programs. The feedback provided by the analyzer 86 to the test generator 78 is important in real situations, where the translation from abstract tests to actual test runs may not be completely accurate.

Foci.

Figure 4:
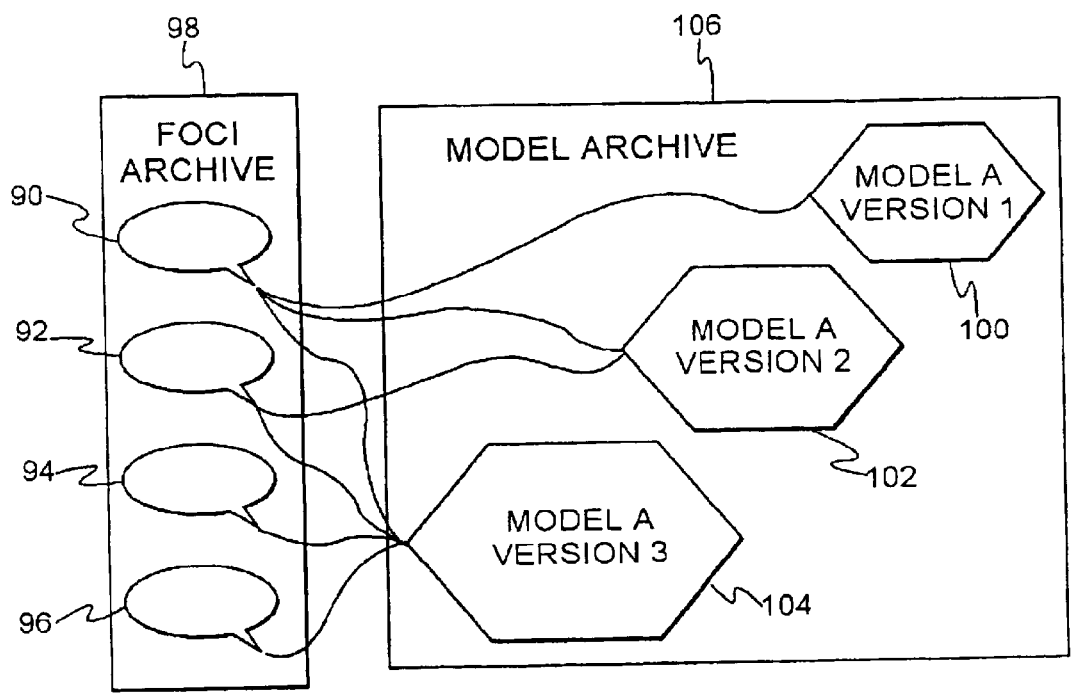
FIG. 4 schematically illustrates a focus and a behavioral model which are used in a preferred embodiment of the invention.
Figure 5:
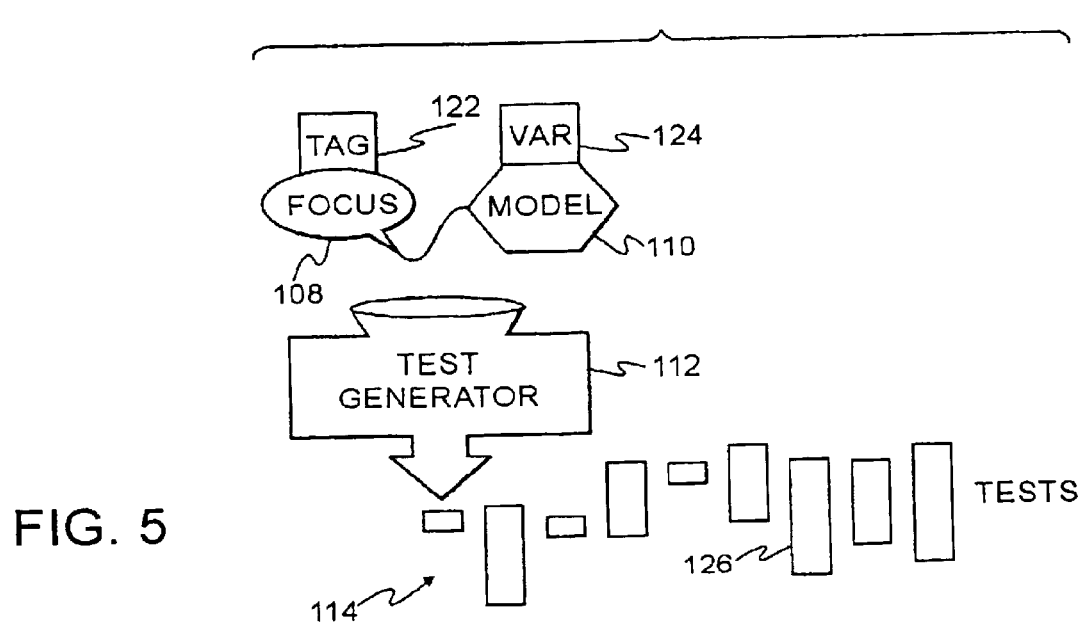
FIG. 5 is a schematic illustration of a test generator that accepts one or more foci and a behavioral model.

The system 64 operates far more satisfactorily if the abstract test suite 80 can be narrowly focused. Referring now to FIGS. 4 and 5, an object, known as a test generation focus, or more simply a "focus" has been found to be useful in producing narrowly focused test suites, and can be used with the system 64. The foci 90, 92, 94, 96 have the attributes of being readily archived, classified, researched, and retrieved, because they have a concise logical structure and meaning. Foci include references to all of the models and versions of models to which they are intended to apply. The foci 90, 92, 94, 96 are stored in a focus archive 98. The focus 90 has references to models 100, 102, 104, which are indicated by solid lines in FIG. 4. The focus 92 has references to models 102, 104, and the foci 94, 96 only have references to model 104. The models 100, 102, 104 are stored in a model archive 106. Thus, foci and models are archived as distinct objects in the focus archive 98, and the model archive 106, respectively. Foci can be created using the user interface 66. In some embodiments, the user interface 66 optionally retrieves foci from an archive of stored foci.

Foci also include a logical expression composed of two types of directives, which are explained with reference to FIG. 5. A focus 108 linked to a behavioral model 110 is input to a test generator 112. The logical expression directs the test generator 112 to create a focused subset 114 of the set of tests that could potentially be generated by the test generator 112 from the behavioral model 110.

Figure 6:
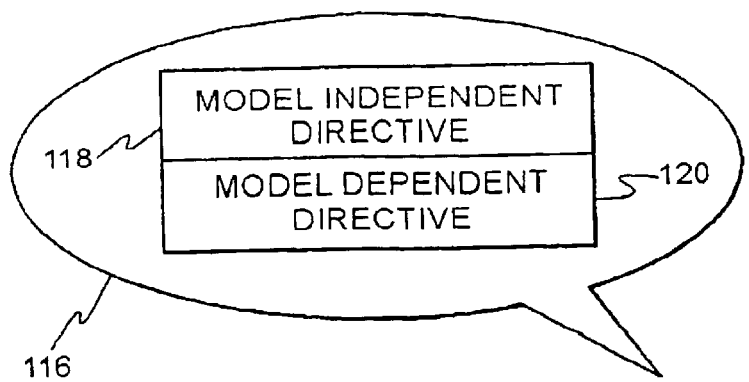
FIG. 6 is a more detailed schematic illustration of the focus shown in FIG. 4.

Referring now to FIG. 6, the internal structure of a focus 116 is shown in further detail. The focus 116 contains a model independent directive 118 and a model dependent directive 120. Each of these represents a distinct class of directives. Model independent directives are generically applicable to most finite state machine models. This type of directive is commonly embodied as command line arguments to the invocation of a test generator. A well-known example of a model independent directive is "all transitions in the model should be included in at least one test". Model dependent directives refer to a particular attribute of a behavioral model, for example a reference to a specific state or set of states. A well-known directive of this type is "a particular state should not be entered by any tests". It is an advantage of the foci according to the invention that both types of directives can be combined in a common archivable focus, together with references to versions of behavioral models to which both types of directives apply.

Model Dependent Directives.

Specific formulations for some model dependent directives will now be disclosed. According to a first directive formulation, a state variable in a behavioral model is tagged with a directive tag, known as a "coverage" tag. Such a tagged state variable acquires the attribute of being a "coverage variable". A variable lacking such a coverage tag is not a coverage variable. Referring again to FIG. 5, the focus 108 includes a coverage tag 122, which references the coverage variable 124 of the behavioral model 110. The test generator 112 responds to the presence of the coverage variable 124 by generating at least one test 126 in the subset 114 that contains at least one state, in which the coverage variable 124 has each of its possible values. For example, the variable Foo has possible values of {true, false). The test 126, when applied to the software application under test will reach at least one state where each of the following assertions is true: 1) the variable Foo equals true; and 2) the variable Foo equals false. Once the test generator 112 has generated tests satisfying the directives with respect to which the coverage variable 124, and any other coverage variables (not shown) are associated, then test generation stops.

It is an important feature of the invention that directive tags are integral to the foci, and are not part of the behavioral model. Each focus is related to a model, and each directive tag is related to some part of the behavioral model.

In a preferred embodiment of the invention, multiple directive tags may be assigned to the same state variable. The effects of directive tags combine. The effects of a plurality of directive tags with respect to a particular coverage variable meaning of the tags together may narrow or expand the meaning that would be assigned to each directive tag taken alone. By assigning a plurality of directive tags to a state variable, it is possible to achieve novel interactions among directive tags, and between directives and parts of behavioral models.

Denoting more than one variable to be a coverage variable in the same behavioral model has a particular interpretation herein. When this occurs, each of the members of the cross-product of the possible values of each variable should be realized in at least one generated test. For example, assume that a coverage variable Foo has possible values {1, 2) and a coverage variable Bar has possible values {a, b). The cross-product of these two sets is {(1,a), (1,b), (2,a), (2,b)}. Given this directive the test generator 112 will attempt to create tests where each of these pairs exists in at least one state of at least one test.

When more than two variables are denoted to be coverage variables, the number of tests generated may be too large for practical test execution with the testing budget, since the number of members of the cross product rises exponentially. In a preferred embodiment of the invention, the use of orthogonal arrays of strength t, the value t being fixed by the user, should be allowed as a method for efficient sampling of the cross product and covering all interactions of t coverage variables within the generated tests. For example if the three variables denoted as coverage variables are Boolean with value domain {F, T}, then instead of generating eight tests (2*2*2), or one test for each member of the cross product, it is sufficient to use the orthogonal array of strength 2 comprising the four tests FFF, FTT, TFT, and TTF to cover all the pair wise interactions of any two of the three variables.

In the preferred embodiment of the invention, multiple directives are always logically combined into a single "directive expression" that a test generator will attempt to fulfill before ceasing the generation process. It may not be possible to make the expression hold true. For example, some states may be unreachable, or directives may be contradictory. Contradictory directives are resolved by precedence rules, for example a simple precedence ordering of directives. Once a directive expression holds true, the test generator will cease after completing the generation of the current test. As was explained above, interactions between directives may add additional meaning to the directive expression.

In one model dependent directive, a tag is termed the "number-of-tests-per-value" tag. This tag specifies the ratio between the number of tests created and the number of possible values for the associated coverage variable. For example, a "one-test-per-value" directive tag simply means that the number of created tests should be greater than or equal to the number of possible values for the variable. Without a number-of-tests-per-value directive tag, all of the possible values for a coverage variable might occur in a single test, which may be undesirable.

Another model dependent directive, the "mask-value" directive, disallows some of the possible values that are enumerated for a coverage variable in a behavior model. This directive can dramatically reduce the number of generated test cases, while still allowing sufficient variation for a particular focus to interact with the test generator and provide useful test results.

Modeling and Testing Directives Language.

As has been explained above, a behavioral model used in the current preferred embodiment of the invention is associated with directives to guide the test generator in its choice of test cases to generate. These directives are principally coverage criteria and test constraints. Other directives may also be given at the time of running the model, but most coverage criteria and test constraints must be coded into foci. It is advisable to keep the coverage criteria and test constraints in separate files to separate out the behavioral aspects of the model from the testing strategy to be used.

The software model may be written in a special purpose language, termed the GOTCHA Definition Language (GDL), for the description of models. This language is based on the Murphi Description Language. The model may also be written in any of the accepted software modeling languages, such as Z, UML, CSP, and SDL.

A GOTCHA Definition Language model is divided into three parts, which must occur one after the other. The software model itself may be spread over a number of files, each of file type ".g". It is preferable that the files containing test generation directives be kept separate from the files that describe the behavioral model itself. The model may also be spread over several physical files. Each of the files should have a filename extension ".g".

The three parts are (1) declarations; (2) functions and procedures; and (3) rules and directives. A GOTCHA Definition Language description consists of A GDL description consists of the following categories:

(1) declarations of constants, types, and global variables;
(2) declarations and descriptions of functions and procedures;
(3) a collection of transition rules;
(4) a description of the states where test cases may start and end;
(5) a set of coverage criteria or foci; and
(6) a set of state invariants and test constraints (optional).

Categories (1)–(3) are taken directly from the well-known Murphi language, and are included here for convenience. Categories (4)–(6) include GOTCHA Definition Language extensions of the Murphi language that adapt the language to the particular requirements of the invention. The part of the GOTCHA Definition Language concerned with the behavioral model is a collection of transition rules. Each transition rule is a command with a pre-condition, a Boolean expression in the global variables, and an action, a block of statements that modify the values of the variables. In the current embodiment of the GOTCHA Definition Language, a transition rule may have several actions associated with it, each of which represents a possible outcome of the transition rule. A transition with more than one possible action is called a "pluRule" and is used to model non-deterministic behavior of the software application under test.

The condition and the actions of the transitional rules are both written in a Pascal-like language. The action can be an arbitrarily complex statement block containing loops and conditionals. No matter how complex it is, the action is executed atomically. No other rule can change the variables or otherwise interfere with an action while it is being executed.

A Sample Model.

This section contains a simple model of a piece of software whose single goal in cyberspace is to generate the characters of the string "HELLOWORLD" and then stop.

A purpose of this section is to clarify the concepts of (1) projected state; (2) reachable state; (3) coverable state; and (4) coverage task. The model is given in Listing 1 below, to which the following description refers.

The TC_EndTestCase clause is a Boolean expression and not an assignment statement. It is shorthand for "Any state where the value of the expression is TRUE is a legitimate place to finish a test."

Figure 7:
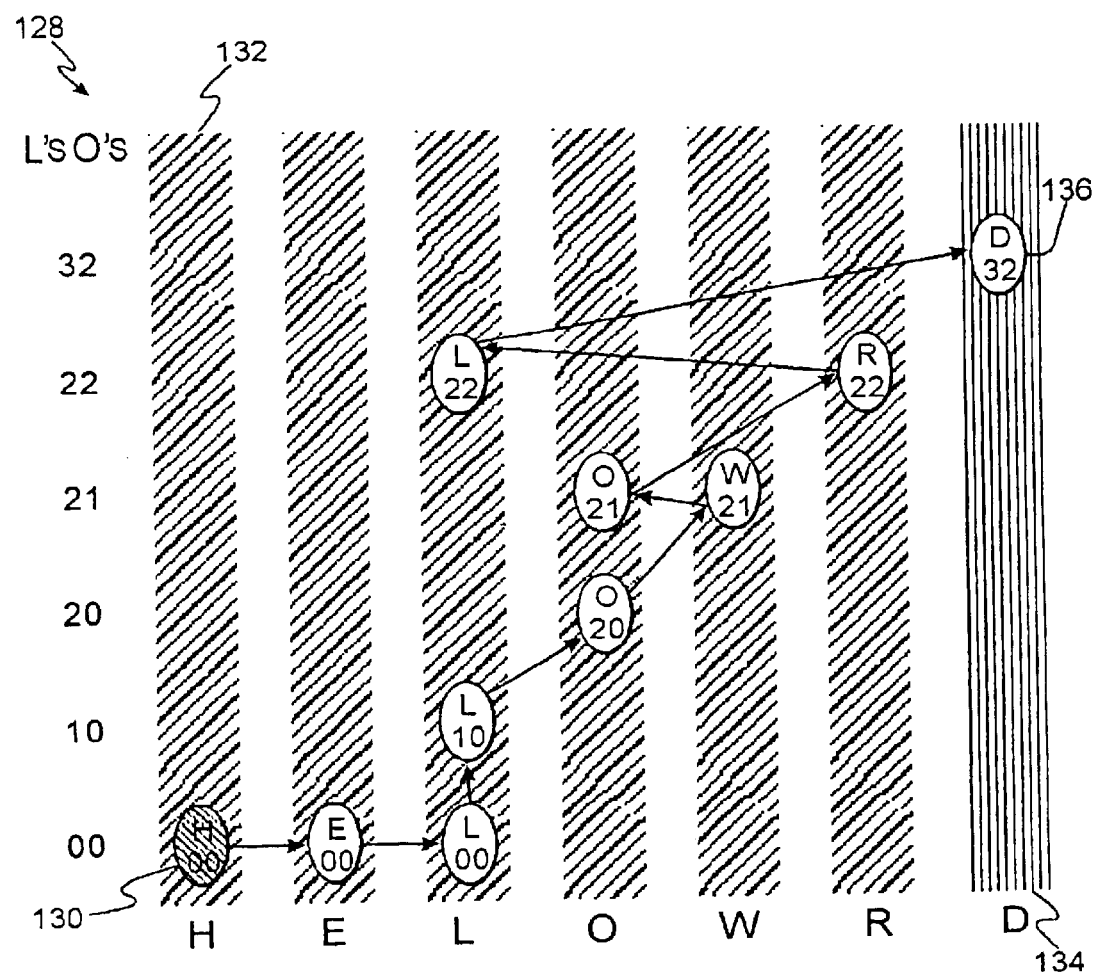
FIG. 7 is a finite state machine graph.

The finite state machine graph described in the model of Listing 1 is shown pictorially in FIG. 7. Each state is described by the values of the state variables, currentChar, NumEls, and NumOhs. In the projection onto the coverage variables, the values taken by the coverage variable, currentChar are on the X-axis, and the values taken by the non-coverage variables, NumEls and NumOhs, are on the Y-axis. Any combination of values in the three state variables is possible, so any position on the graph 128 shown in FIG. 7 could represent a state. For example the state 130, in which the variables currentChar=H, NumEls=0, and NumOhs=0, is represented in the bottom left hand corner of the graph 128. A state in which the variables currentChar=H, NumEls=3, and NumOhs=2, would be represented in the top left hand corner. All states in which the variable currentChar=H are in the leftmost column 132. All states in which the variable currentChar=D are in the rightmost column 134. State 130 is the start test case state. The set of end test cases comprises all states in the rightmost column 134. In the example illustrated in the graph 128, there is only one member of the set of end test cases, the state 136.

The rule, Next_Character( ), enables a passage from one state to the next state. In general when drawing state graphs, the arrows are labeled with the name of the rule that is activated to make the transition between states. In the graph 128, as there is only one rule, labeling the arrows has been omitted.

Figure 8:
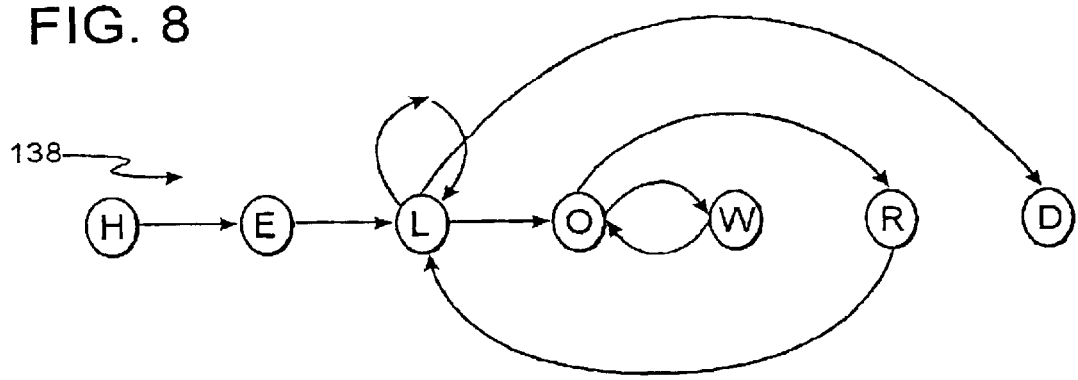
FIG. 8 is a projection of the state diagram of the example illustrated in the graph of FIG. 7.

A state diagram 138 of the example of FIG. 7 is illustrated in FIG. 8. The state diagram 138 shown on the projected graph is derived from the graph 128 by projecting all the states in a single column onto a single projected state.

Reachable and Unreachable States.

Figure 9:
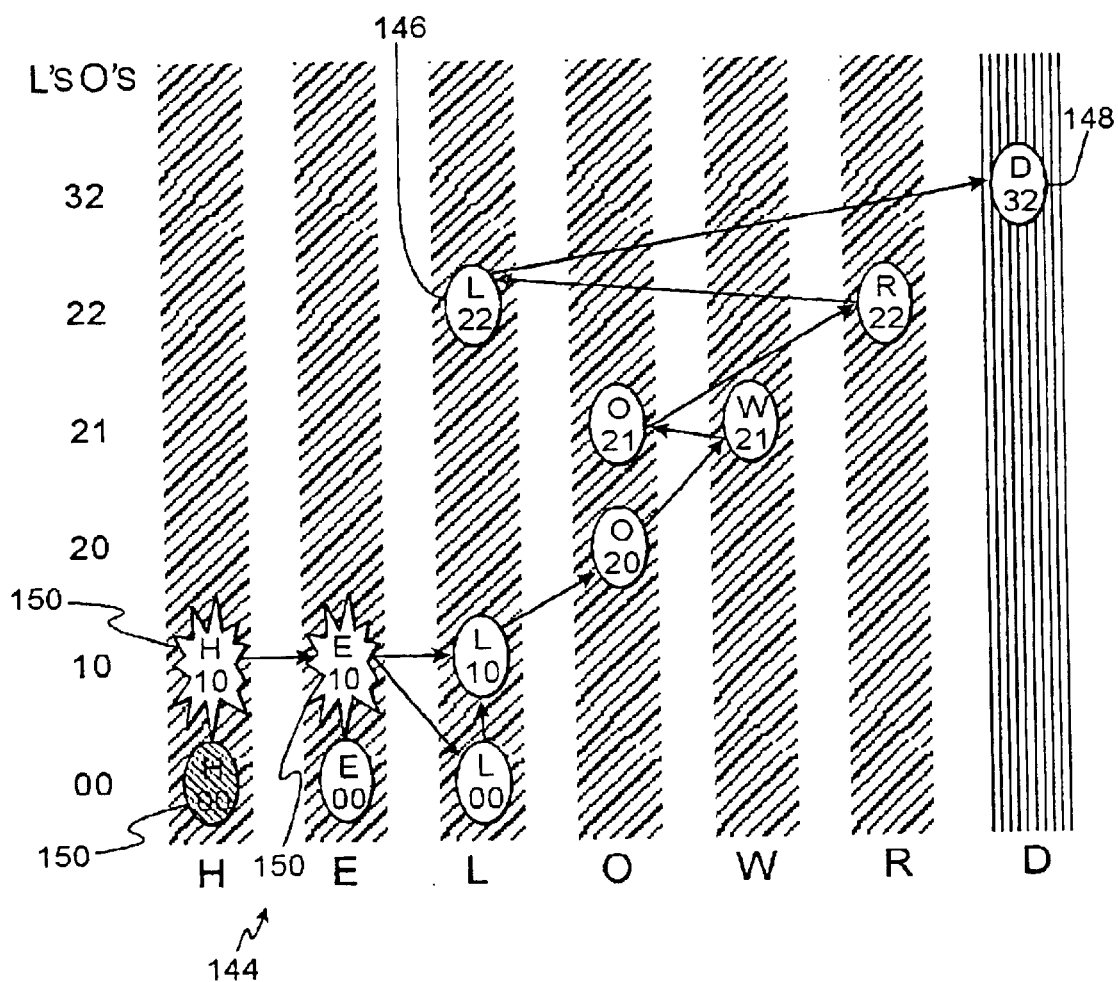
FIG. 9 is a finite state machine graph.

The concepts of reachable states, unreachable states and coverage tasks are presented with reference to FIG. 9, which presents a slightly modified "Hello World" example. A state is reachable if there is a sequence of transitions (rules) that produces the state from a start test case state. The state 140, having the value H10, and the state 142, having the value E10, are unreachable, despite the fact that they are legitimate values of the three state variables. All the letters of the alphabet other than the letters "HELWORD" are in unreachable states. In the graph 144, instead of the clause, TC_EndTestCase Char=D, there is a clause, TC_EndTestCase Char=R.

A state is coverable if there exists a path from a start test case state to the state in question, and then on to an end test case state. In the graph 144, the state 146, having the value L22, and the state 148, having the value D32, are both reachable states. They can be reached from the start test case state 150. However, they are uncoverable, since there is no path from either of these states to an end test case state.

Coverage Tasks.

Figure 10:
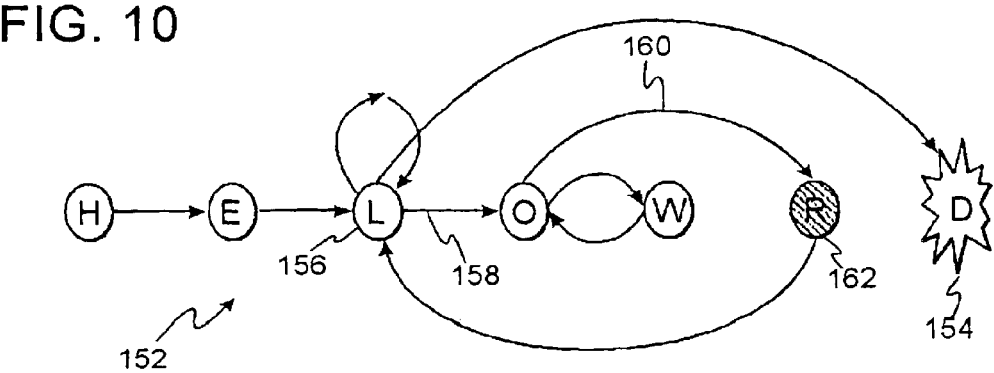
FIG. 10 is a is a projection of the state diagram of the example illustrated in the graph of FIG. 9.

A coverage task is a set of states or transitions, all of which satisfy some instance of a coverage criterion. In the case of state projection coverage, a coverage task is a projected state, or equivalently, the set of all states in the full graph that map onto a state in the projected graph. Each member of the set is called a representative of the coverage task. A coverage task is uncoverable if all its representatives are uncoverable. FIG. 10 shows the projection graph 152, corresponding to the example of FIG. 9. The projected state 154, having the value "D", is uncoverable, but the projected state 156, having the value "L", is coverable, since there is a path, indicated by the arrows 158, 160, from at least one of its representatives to a final state 162.

Directive Construction.

Testing directives are used specifically to drive the test generation process, not to describe the behavioral model of the software under test. One type of testing directive specifies coverage criteria, and in another type specifies test constraints.

Test constraints.

The syntax of test constraints is given formally as follows:

```
<testconstraint> ::= TC_EndTestCase < string >
<boolexpr>
TC_Forbidden_State [<string>] < boolexpr > |
                    TC_Forbidden_Transition
[<string>] < boolexpr >; < boolexpr > |
                    TC_Forbidden_Transition
[<string>]
[From] < boolexpr > To <boolexpr > |
                    TC_Forbidden_Path [<string>] <
boolexpr >; < boolexpr >; <expr> |
                    TC_Forbidden_Path [<string>]
[From] < boolexpr > To <boolexpr > Length
<expr>|
                    TC_Within [<string>] < boolexpr
```

```
-continued

>; < boolexpr >; <boolexpr > |
                    TC_Within [<string>]
[From] < boolexpr > To < boolexpr > Includes <
boolexpr >
```

Test constraints have an optional string, which is used in the abstract test suite as a name for the test constraint. This is especially important in the case of a constraint, TC_EndTestCase, which appears at the end of every test case.

The expressions must all be Boolean expressions in the variables within the scope of the constraint. The only exception is the length expression in the forbidden path test constraint. This must evaluate to an integer. In the current embodiment, the integer must be in the range 2–7.

The syntax of the constraint end test case, (TC_EndTestCase), is given as follows:

TC_EndTestCase <string> <expr>

The end test case state is the last state in any test generated by the test generator, thus it is effectively a test constraint. Every test must finish in a state where some end test case expression evaluates to the value True.

If no TC_EndTestCase directive is specified among the foci, then the compiler inserts a default constraint that makes every state an end test case state:

TC_EndTestCase "Default" TRUE;

The string is output to the test case as a method pattern, and any parameters to the constraint TC_EndTestCase are output as data patterns in the abstract test suite.

The semantics of the forbidden state test constraint are: no test will be generated that passes through a state where the expression evaluates to the value TRUE. This constraint is applied throughout the test generation, and it can have a drastic effect on the size of the reachable state graph. It is an essential element in controlling the size of the test suite and in dealing with the state explosion problem.

For example, specifying the constraint TC_Forbidden_State var1=3, removes all states where the variable var1=3 from the state space and thus from all the tests generated. Any state that can only be reached via states with the variable var1=3 will also be eliminated. Specifying the constraint TC_Forbidden_State TRUE prevents the compiler from generating any tests, since all paths pass through a forbidden state.

The semantics of a forbidden transition test constraint are: No test will be generated that passes through a transition where a first expression is true before the transition, and a second expression is true after the transition. This constraint is applied throughout the test generation, and it can decrease the size of the reachable state graph. It is a method for controlling the size of the test suite and dealing with the state explosion problem. For example, specifying the constraint TC_Forbidden_Transition var1=3; var1!=3 removes all transitions from the state space when the variable var1 is altered from the value 3 to some other value by the transition. Any state that can only be reached via such a transition will also be eliminated.

The semantics of a forbidden path test constraint are: No test will be generated that passes from a state where the first expression is true to a state where the second is true in k or fewer steps, where the variable k is the value of the third expression. When the variable k=1, this is just a forbidden transition, and the forbidden transition construct should be used. This constraint is applied throughout the test generation. It can have a positive or negative effect on the size of the reachable state space, since an additional state variable is introduced to keep track of the constraint. Specifying the constraint TC_Forbidden Path var1=3; var1!=3; 4; removes all execution sequences which alter var1 from 3 to another value in four or fewer steps. Any state that can only be reached via such a sequence will also be eliminated.

The semantics of a test constraint "Within" are that: No test will be generated that passes from a state where a first expression evaluates to the value True to a state where a second expression evaluates to the value True, without passing through a state where a third expression evaluates to the value True. This constraint is applied throughout the test generation. It can have a positive or negative effect on the size of the reachable state space, since an additional state variable is introduced to keep track of the constraint.

For example, specifying the constraint TC_Within as "interesting" From Cmd=FileOpen To Cmd=FileClose Includes Cmd=Write & nbytes>0; causes all test sequences, which contain a close command following an open command to include a write command with a non-zero value of the number of bytes, nbytes, to be written.

Coverage Criteria.

The formal syntax for a coverage criterion is:

```
<coveragecriterion> ::=
CC_Some_State [<string>] <boolexpr>|
                    CC_Some_Transition [<string>]
<boolexpr>;
<boolexpr> |
                    CC_Some_Transition [<string>]
[From] <boolexpr> To <boolexpr> |
CC_State_Projection [<string>]
<boolexpr> On <type_exprs_pairs> ; |
                    CC_Transition_Projection
[<string>]
From_condition <boolexpr> From
<type_exprs_pairs> ;
To_condition <boolexpr>To <type_exprs_pairs> ;
|
CC_All_State [<string>] <boolexpr> |
                    CC_All_Transition [<string>]
<boolexpr>; <boolexpr> |
                    CC_All_Transition [<string>]
[From] <boolexpr> To <boolexpr>
<type_exprs_pairs> ::= <type_expr_pair>
{;[<type_expr_pair>]}
<type_expr_pair> ::= expr : typeid |
enum_type_expr
```

Coverage criteria are a way to direct the test generator. They supply criteria for tests to be generated, as opposed to test constraints. The latter inform the test generator which tests not to generate.

The coverage criteria all have an optional string that is only used in the printout as a name for the criterion. The expressions denoted by the identifier boolexpr must all be Boolean expressions in the variables within the scope of the criterion.

The <type_exprs_pairs> token stands for a semicolon delimited string of tokens, each of which is either a simple expression, or a simple expression followed by its type identifier. The type identifiers are only necessary when the expression is of an integer subrange type, otherwise, the type identifier can be omitted, since the compiler can deduce the type of the expression. A Boolean expression is a special case of an enumerated type expression.

"Some state" coverage is a criterion that describes a single coverage task. The task is specified by a Boolean expression, which is evaluated at each state in order to decide if it is a representative of the coverage task or not. Any state wherein the Boolean expression evaluates to the value TRUE is a representative of this coverage task. The compiler then generates a test case that passes through a randomly chosen representative state.

Specifying the coverage criterion, CC_Some_State= TRUE; causes the compiler to generate a single test through a randomly chosen state. If no coverage criteria are given in the model, this coverage criterion is the default, which is added to the model.

Specifying the coverage criterion, CC_Some_State "Interesting" var1=3 & var2=4; causes the compiler to generate a single test which includes a randomly chosen state where the variable var1=3 and the variable var2=4, if such a state exists which is both reachable and coverable.

"Some transition" coverage also describes a single coverage task. The task is specified by Boolean expressions, which are evaluated at the beginning and end of each transition, in order to decide if it is a representative of the coverage task or not. Any transition from the state s to the state t where the FROM expression evaluates to the value TRUE on the state s and the TO expression evaluates to the value TRUE on the state t is a representative of the task. Accordingly, the compiler generates a test case that passes through a randomly chosen representative transition.

Specifying the coverage criterion CC_Some_Transition TRUE; TRUE;—causes the compiler to generate a single test through a randomly chosen transition, since every transition is a representative of this task.

Specifying the coverage criterion CC_Some_State "Interesting" var1=3; var2=4; causes the compiler to generate a single test which includes some transition from a state where the variable var1=3 to a state where the variable var2=4, if such a transition exists which is both reachable and covetable.

"State projection" coverage describes a set of coverage tasks, rather than a single task. Each task is a state in a projection of the finite state machine. The projection variables are the expressions given in the list of expressions. The condition provides a method for creating an additional subset of the set of tasks and their representatives.

For example to specify coverage tasks in the "Hello World" model projected onto the values of the variable CurrentChar, the following coverage criterion would be used:

CC_State_Projection TRUE On currentChar;

This means that each coverage task is specified by the different values taken by the variable currentChar. One coverage task is represented by any state where the variable currentChar=A, another by all states where the variable currentChar=B, up to a maximum of 26 coverage tasks. In the example "HELLO WORLD", the coverage task with currentChar=L has three representatives.

If, in the example "HELLO WORLD", It were to be specified:

CC_State_Projection NumOhs=1 On currentChar;

Then only two reachable states would satisfy the condition (O,2,1) and (W,2,1), where each state is denoted by the triple (currentChar, numEls, numOhs). Since each of these is in a different coverage task, that is to say, each has different values for the variable currentChar, the compiler would attempt to generate two test cases, one through each of these states.

In another example, if a state contains two integer variables x and y, but the user is interested in test cases where the values of the sum x+y are distinct, then one would use the coverage criterion:

CC_State_Projection TRUE On x+y:sum_range_t;

An upper bound on the number of coverage tasks generated by a State Projection criterion of the form:

CC_State_Projection boolexpr On var1; var2; var3;

is the product of the ranges of the three variables var1, var2, and var3. If all three variables were Boolean, then up to 2*2*2=8 tasks would be generated by this coverage criterion. The actual number of tasks, and hence test cases, generated could be smaller, for one of the following reasons: (1) the effect of the Boolean expression in defining subsets may reduce the number of representatives of a task to zero; (2) not all eight tasks may be reachable from a StartTestCase state; (3) more than one of the tasks may be covered by a single test case; and (4) no reachable representative of a task is actually covetable.

Listings 2 and 3 are code fragments illustrating the use of coverage criterion CC_State_Projection. Listing 2 represents a behavioral model, and Listing 3 represents a set of foci that apply to the model.

"Transition projection" describes a set of coverage tasks similar to state projection. This is essentially a projection of the state space onto two different sets of variables, whose values are given by the expressions in the lists. Transition projections of the transitions of interest are considered distinct, when their first state is projected onto the first list, and their second state is projected onto the second list. Moreover, different conditions for creating subsets can be specified for each of the two projections. The syntax is as follows:

CC_Transition Projection

From_Condition TRUE From var1; var2; var3;

To_Condition TRUE To var1; var2; var3;

Assume that BoolArray is an array of Boolean variables, and that enumvar1 is of an enumerated type with three possible values, v1, v2, and v3. Then specifying CC_Transition_Projection "Interesting"

From_Condition system=stable From BoolArray[0];

To_Condition system=unstable To enumvar1;

causes the compiler to generate up to 2*3=6 test cases:

a transition from a state with system=stable and BoolArray[0]=TRUE to a state with system=unstable and enumvar1=v1;

a transition from a state with system=stable and BoolArray[0]=TRUE to a state with system=unstable and enumvar1=v2;

a transition from a state with system=stable and BoolArray[0]=TRUE to a state with system=unstable and enumvar1=v3;

a transition from a state with system-stable and BoolArray[0]=FALSE to a state with system=unstable and enumvar1=v1;

a transition from a state with system=stable and BoolArray[0]=FALSE to a state with system=unstable and enumvar1=v2;

a transition from a state with system=stable and BoolArray[0]=FALSE to a state with system=unstable and enumvar1=v3;

There may be fewer than six test cases generated if there are no reachable and coverable transitions, in which one of the above situations occurs. Fewer than six test cases may also be generated if a single test case can be constructed with more than one of the required transitions occurring in the same test case.

"All state" coverage describes a subset of all projected states that are projected onto the coverage variables. The use of this coverage criterion is no longer recommended. This is because state projection allows the user to define an equivalent coverage criterion without the use of coverage variables in the declarations section of the model.

Specifying the coverage criterion CC_All_State Boolexpr; is equivalent to the projected state coverage achieved by the coverage criterion CC_State_Projection Boolexpr On var1; var2; var3, where var1, var2, and var3 are defined as Coverage_var in the declarations section of the model.

The use of this criterion and its companion coverage criterion CC_All_Transition can be effective, but is not preferred, since they require the coverage notions to be a part of the behavioral model, rather than a separate entity in a possibly different file.

"All transition" coverage describes a subset of all projected transitions projected onto the coverage variables. The subset is specified by the Boolean expressions, which are evaluated at the start and end of each transition to decide if it is a representative of a coverage task or not. The use of this coverage criterion is not preferred. This is because the coverage criterion transition projection allows the user to define an equivalent coverage criterion without the use of coverage variables in the declarations section of the model.

If the variables var1, var2, and var3 are defined as type coverage_var in the declarations section of the model, then CC_All_Transition Boolexpr1; Boolexpr2; is equivalent to the transition projection criterion:

CC_Transition_Projection
From_Condition Boolexpr1 From var1; var2; var3;
To_Condition Boolexpr2 To var1; var2; var3;.

Additional coverage criteria are now disclosed.

CC_All_Rule_Variation. This coverage criterion guarantees that all transition rules for the application are covered in all their variations, with all possible combinations of parameters in the model. This is usually referred to as Variation Testing" in the literature.

CC_All_Rule_Boundary. This coverage criterion guarantees that all transition rules for the application are covered, with all boundary values of parameters in the model. This is usually referred to as "Boundary Value Testing" in the literature.

CC_All_Rule_Random <n>. This coverage criterion guarantees that all transition rules for the application are covered, with n randomly chosen values of parameters in the model. This is usually referred to as "Random Variation Testing" in the literature.

CC_All_Rule_Random <1>. This coverage generates one randomly chosen value of parameters in the model, not including boundary values, and this referred to as "Basic Usage Testing".

CC_All_Rule_Output. This coverage criterion guarantees that all transition rules for the application are covered, in combination with all possible output values for the rule's execution. This is analogous to variation testing, which combines the rules with all possible inputs.

CC_All_Rule_Input_Output. A stronger coverage criterion covering all combinations of rules, inputs, and outputs.

One could also parameterize the above criteria by giving single rule names, e.g. CC_Rule_Variation <RuleName> CC_Rule_Boundary <RuleName>, etc.

The coverage criterion, CC_Rule_Interleaving <n> <list of RuleNames>, guarantees that concurrent interleaving of the listed transition rules for the application is covered, with n randomly chosen values of parameters in the model. This is usually referred to as "Interleaving Testing" or "Interaction Testing" in the literature.

There can be further parameterization by taking a subset of the input and outputs as parameters to the coverage criteria. Such a subset is an example of a focus.

Application to Test Plans and Maintenance.

Partitioning of the foci and the behavioral models has been shown to significantly facilitate and improve the process of testing software generally, and particularly the aspect of test planning. Foci are used in test planning. Because they are concise objects, they can be entirely included in test plans, rather than merely referencing them. Commentary may be associated with foci in the test plan in order to clarify the intention of executing the tests that follow from each focus. The order and schedule of testing may be annotated with reference to foci.

The first step of traditional test maintenance is identifying tests and parts of tests, which need to be updated for successive releases of software. Due to the voluminous nature of test results, it is often difficult to accomplish this task efficiently. In the foci used in the preferred embodiment of the invention, most directives reference state variables of the test generation model. These state variables are generally compatible with updated versions of the behavior model as long as the state variables remain unchanged. Foci in need of revision can be automatically determined using a suitable scanning program.

Figure 11:
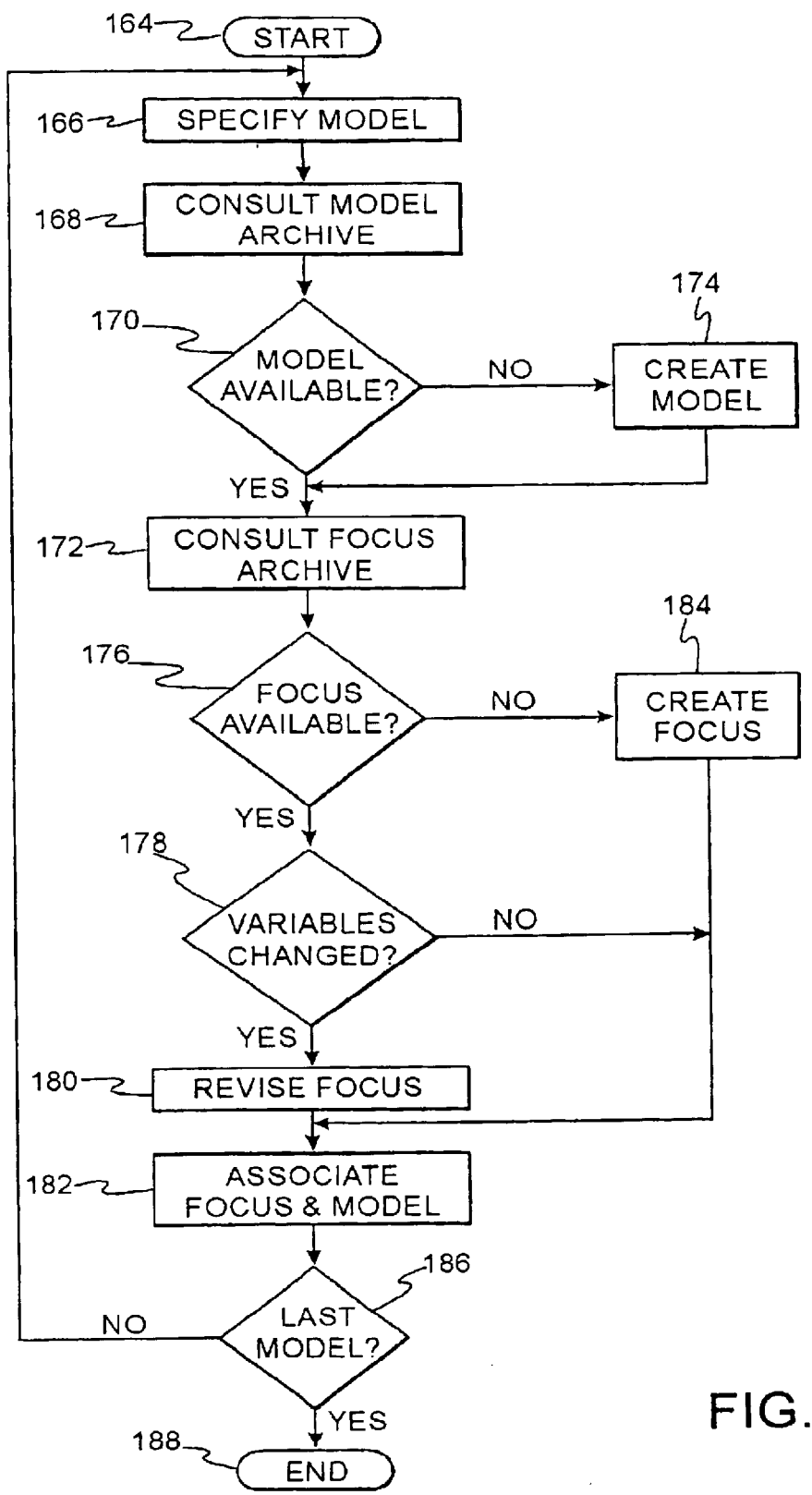
FIG. 11 is a more detailed flow chart illustrating a portion of the method shown in FIG. 2.

Referring again to FIG. 2, the preparation of the behavioral model in step 18 is explained in further detail in view of the foregoing disclosure. The process is explained with reference to FIG. 11, and begins at initial step 164. At step 166 the general specifications of a behavioral model are determined. State variables are tentatively selected at this point for association with a focus. Then, at step 168, an archive of previously stored behavioral models is consulted.

At decision step 170, it is determined if a suitable behavioral model has been previously constructed and is available for reuse. If the software application under test is a revision, existing behavioral models will normally be available. Even in new software applications, previously constructed behavioral models may be usable with relatively minor adjustments.

If at decision step 170 a suitable model was determined to be available, it is retrieved from the model archive, and a focus archive consulted at step 172. However, if at decision step 170 no suitable model was located in the model archive, then execution proceeds to step 174, where a behavioral model is prepared conventionally. Control then proceeds to step 172.

Next, in decision step 176 it is determined if step 172 has yielded a suitable focus for reuse, which references the state variables selected in step 166 and has other desired directives.

If such a focus is determined to be available at decision step 176, then at decision step 178 critical evaluation of the tagged state variables corresponding to the state variables that were selected at step 166 have changed. If so, then the directives of the focus are appropriately revised at step 180. At step 182, the focus and the behavioral model are associated together.

If, at decision step 176 it is determined that no suitable focus is available, then at step 184 an ad hoc focus is coded, and execution then proceeds to step 182.

Control then passes to decision step 186, where it is determined if more models need to be prepared for a test suite. If so, then control reverts to step 166, and the process iterates. If no more models need to prepared, then the process completes at termination step 188.

If, at decision step 178, it is determined that the state variables are unchanged, then step 180 is omitted, and control proceeds directly to step 182.

It will be appreciated that the behavioral model and the focus are separate data structures, and are independently retrieved from their respective archives. In many cases, suitable foci and behavioral models are available, and little or no coding will be required of the testing operators. In other cases, only one of the two needs to be created. Only in the case where both the focus and the behavioral model are required to be recoded does the cost of the process rise to that of conventional behavioral model preparation.

In some embodiments, a state space is shared between two or more behavioral models that test different pieces of a software program. In practice, the different pieces are often assigned to different modeling-testing personnel. This means that foci developed for one piece of the software application under test are compatible with the behavioral models for different pieces of the software. Foci are hard-won objects, and any reuse has practical value. Well designed foci are applicable to multiple behavioral models that share the same state variables. Foci are scored and ranked based on their efficacy. For example, a focus that has a history of finding defects in one part of the program may be a candidate for focusing testing of another part of the program. Focus rank is a criterion for inclusion of the focus in regression testing.

The choice of foci and the component parts of a directive expression determine how many tests will be generated from a model. For example, the number of generated tests is greatly increased whenever a coverage variable is added. Immediate numerical feedback is provided when a focus is modified. The cost of focus modification must be taken into account in practical environments, and balanced against the costs that would be incurred in committing resources without the focus modification. The latter approach could result in large numbers of aborted test generation cycles. According to the invention, rapid numerical feedback tends to minimize the cost of focus modification, and generally reduces the cost of the software testing process.

Limiting the number of generated tests is accomplished in other ways. For example, a directive may temporarily disallow some values of a coverage variable that are enumerated in a behavioral model. The selection of values to disallow is however not based on static inherent properties of the software application under test. It is instead based on the dynamically changing needs of a testing process that extends over a period of time.

Computer Program Listings.

Listing 1

```
Var currentChar: enum {A, B, C, D, E, F, G, H, I, J, K,
        L, M, N, O, P, Q, R, S, T, U, V, W, X, Y, Z};
Var NumEls: 0. .3;
    NumOhs: 0. .2;
TC_StartTestCase "Initialize_Message()"
Begin
    currentChar := H;
    clear NumEls;
    clear NumOhs;
End;
Rule "Next_Character( )"
    currentChar != D
==>
begin
switch currentChar
        case H: currentChar := E;
        case E: currentChar := L;
        case L:
            switch NumEls
                case 0: currentChar := L; NumEls:= 1;
                case 1: currentChar := O; NumEls:= 2;
                case 2: currentChar := D; NumEls:= 3;
```

-continued

Listing 1

```
                case 3: put "Cant get here L";
            endswitch;
        case O:
            switch NumOhs
                case 0: currentChar:= W; NumOhs:= 1;
                case 1: currentChar:= R; NumOhs:= 2;
                case 2: put "Cant get here O";
            endswitch;
        case W: currentChar:= O;
        case R: currentChar:= L;
        else put "Cant get here Other";
    endswitch;
End;
TC_EndTestCase "End_Message"
    currentChar = D;
```

Listing 2

```
Const MAX : 3;
Type NumEntries_t : 0..MAX;
    action_t :    enum {no_action,add,update,remove,get};
    name_t :      enum {no_name,Ilan,Guy,Gadi};
    address_t :   enum {no_address, a123, a456, a789};
    response_t :  enum {Success, Fail, NameExist,
    NameNotExist};
    entry_t : Record
                    name :       name_t;
                    address : address_t;
            End;
    A2E_1_t :    Record
                    connected :   boolean;
                    response :    response_t;
                    last_entry :  entry_t;
            End;
    A2E_2_t : Record
                    action :     action_t;
                    last_entry : entry_t;
                    data : array [NumEntries_t] of entry_t;
            End;
Var client : A2E_1_t;
    data_base : A2E_2_t;
Function isNotFull( ): boolean;
    Var result : boolean;
    Begin
        result := exists i : 1..MAX Do
                    data_base.data[i].name = no_name
                endexists;
        return(result);
    End;
Function NameIndex (n : name_t): NumEntries_t;
    Var i: NumEntries_t;
    Begin
        for i : 1..MAX do
            if data_base.data[i].name = n then
                return i;
            endif;
        endfor;
        return 0;
    End;
Procedure AddEntry (n : name_t; a : address_t);
    Begin
        for i : 1..MAX Do
            if data_base.data[i].name = no_name then
                data_base.data[i].name := n;
                data_base.data[i].address := a;
                        return;
            endif;
        endfor;
    End;
Procedure doAction (n : name_t; a : address_t; ac : action_t);
    Begin
        client.last_entry.name          := n;
        client.last_entry.address       := a;
```

Listing 2-continued

```
        data_base.last_entry.name      := n;
        data_base.last_entry.address   := a;
        data_base.action := ac;
        client.response := Success;
            if n = no_name then
                data_base.last_entry.name := no_name;
                data_base.last_entry.address := no_address;
                data_base.action := no_action;
                    client.response := Fail;
        Endif;
    End;
Ruleset n : name_t; a : address_t
    Do
        Rule "add(n,a)"
                client.connected & isNotFull( )
        ==>
        Begin
                doAction(n,a,add);
                if (client.response = Success) then
                        if NameIndex(n)>0 then
                            client.response := NameExist;
                        else
                            AddEntry(n,a);
                        endif;
                Endif;
        End;
        Rule "update(n,a)"
                client.connected
        ==>
        Var i : NumEntries_t;
        Begin
                doAction(n,a,update);
                if (client.response = Success) then
                    i := NameIndex(n);
                    if i = 0 then
                        client.response := NameNotExist;
                    else
                        data_base.data[i].address := a;
                        client.response := Success;
                    endif;
                Endif;
        End;
    End;
Ruleset n : name_t
    Do
        Rule "remove(n)"
                client.connected
        ==>
        Var i : NumEntries_t;
        Begin
                doAction(n,no_address,remove);
                if (client.response = Success) then
                    i := NameIndex(n);
                    if i= 0 then
                        client.response     := NameNotExist
                    else
                        data_base.data[i].name    := no_name;
                        data_base.data[i].address := no_address;
                        client.response     := Success;
                    endif;
                Endif;
        End;
        Rule "get(n)"
                client.connected
        ==>
        Var i : NumEntries_t;
        Begin
                doAction(n,no_address,get);
                if (client.response = Success) then
                    i := NameIndex(n);
                    if i= 0 then
                        client.response := NameNotExist;
                    else
                        data_base.last_entry.address := data_base.data[i].address;
                        client.last_entry.address := data_base.data[i].address;
                        client.response := Success;
                    endif;
```

Listing 2-continued

```
                Endif;
            End;
        End;
Rule "client.disconnect( )"
        client.connected
==>
Begin
        client.connected := FALSE;
        client.response := Success;
End;
TC_StartTestCase "INIT_SYSTEM"
Var i : NumEntries_t;
Begin
        client.connected := TRUE;
        client.response := Success;
        client.last_entry.name := no_name;
        client.last_entry.address := no_address;
        data_base.action := no_action;
        data_base.last_entry.name := no_name;
        data_base.last_entry.address := no_address;
        for i : NumEntries_t do
                data_base.data[i].name := no_name;
                data_base.data[i].address := no_address;
        endfor;
End;
TC_EndTestCase "client.disconnectClient( )"
        !client.connected
```

Listing 3

```
/*********************************************************
* Copyright International Business Machines Corporation
* 2000.
*
* ALL RIGHTS RESERVED.
*
*********************************************************/
-- Coverage Criterion for the NameServer model
CC_State_Projection "Status of client"
        TRUE On
        client;
CC_Transition_Projection "Changes in status of a database
when a client tries to update or to remove a notexisting
entry"
        From_Condition TRUE
        From data_base;
        To_Condition (data_base.action=remove &
            client.response=NameNotExist) |
                (data_base.action=update &
            client.response=NameNotExist)
        To data_base;
```

While this invention has been explained with reference to the structure disclosed herein, it is not confined to the details set forth, and this application is intended to cover any modifications and changes as may come within the scope of the following claims:

What is claimed is:

1. A method of test generation for testing computer software, comprising the steps of:
    responsively to a specification of a software application being verified, modeling said software application as a finite state machine to define a behavioral model of said software application;
    associating said behavioral model with a focus, said focus having a reference to said behavioral model, and having at least one directive; and
    responsively to said directive, generating a test program for verification of said software application according to state transitions of said behavioral model.

2. The method according to claim 1, wherein said directive comprises a model independent directive.

3. The method according to claim 1, wherein said directive comprises a model dependent directive, and a coverage variable of said behavioral model is tagged by a tag of said model dependent directive, said coverage variable having allowable values.

4. The method according to claim 3, wherein said directive further comprises a model independent directive.

5. The method according to claim 3, wherein said test program references said coverage variable, and said step of generating is performed until said coverage variable has assumed each of said allowable values.

6. The method according to claim 5, wherein said coverage variable comprises a plurality of coverage variables, further comprising the step of defining a cross product of said coverage variables, said cross product having members formed by said allowable values of said coverage variables, wherein said step of generating is iterated to produce a plurality of test programs until each of said members is included in at least one of said test programs.

7. The method according to claim 5, wherein said coverage variable comprises a plurality of coverage variables, further comprising the step of defining an orthogonal array of said coverage variables, said orthogonal array having members formed by said allowable values of said coverage variables, wherein said step of generating is iterated to yield a plurality of test programs until each of said members is included in at least one of said test programs.

8. The method according to claim 3, wherein said model dependent directive comprises a plurality of model dependent directives, and said coverage variable is tagged by a plurality of tags of said model dependent directives.

9. The method according to claim 3, wherein said tag is a number-of-tests-per-value tag.

10. The method according to claim 3, wherein said model dependent directive is a mask-value directive.

11. The method according to claim 1, wherein said directive comprises a plurality of directives that are combined to define a directive expression, wherein said step of generating is performed until said directive expression has a predetermined value.

12. The method according to claim 1, wherein said step of modeling is performed by retrieving said behavioral model from a model archive.

13. The method according to claim 1, wherein said step of associating is performed by retrieving said focus from a focus archive.

14. The method according to claim 13, further comprising the steps of comparing state variables of foci of said focus archive with state variables of said behavioral model; and
responsive to comparisons resulting from said step of comparing revising selected ones of said foci.

15. A computer software product, comprising a computer-readable medium in which computer program instructions are stored, which instructions, when read by a computer, cause the computer to execute a method of test generation for testing computer software, the method comprising the steps of:
accepting as a first input a behavioral model of a software application being verified, wherein said behavioral model is created responsively to a specification of said software application, and said behavioral model comprises a finite state machine;
accepting as a second input a focus having a reference to said behavioral model, and having at least one directive;
associating said behavioral model with said focus; and
responsively to said directive, generating a test program for verification of said software application according to state transitions of said behavioral model.

16. The computer software product according to claim 15, wherein said directive comprises a model independent directive.

17. The computer software product according to claim 15, wherein said directive comprises a model dependent directive, and a coverage variable of said behavioral model is tagged by a tag of said model dependent directive, said coverage variable having allowable values.

18. The computer software product according to claim 17, wherein said directive further comprises a model independent directive.

19. The computer software product according to claim 17, wherein said model dependent directive comprises a plurality of model dependent directives, and said coverage variable is tagged by a plurality of tags of said model dependent directives.

20. The computer software product according to claim 17, wherein said tag is a number-of-tests-per-value tag.

21. The computer software product according to claim 17, wherein said model dependent directive is a mask-value directive.

22. The computer software product according to claim 17, wherein said test program references said coverage variable, and said step of generating is performed until said coverage variable has assumed each of said allowable values.

23. The computer software product according to claim 22, further comprising the step of defining a cross product of said coverage variables, said cross product having members formed by said allowable values of said coverage variables, wherein said step of generating is iterated to produce a plurality of test programs until each of said members is included in at least one of said test programs.

24. The computer software product according to claim 22, further comprising the step of defining an orthogonal array of said coverage variables, said orthogonal array having members formed by said allowable values of said coverage variables, wherein said step of generating is iterated to yield a plurality of test programs until each of said members is included in at least one of said test programs.

25. The computer software product according to claim 15, wherein said directive comprises a plurality of directives that are combined to define a directive expression, wherein said step of generating is performed until said directive expression has a predetermined value.

26. The computer software product according to claim 15, wherein said step of modeling is performed by retrieving said behavioral model from a model archive.

27. The computer software product according to claim 15, wherein said step of associating is performed by retrieving said focus from a focus archive.

28. The computer software product according to claim 27, further comprising the steps of comparing state variables of foci of said focus archive with state variables of said behavioral model; and
responsive to comparisons resulting from said step of comparing revising selected ones of said foci.

29. A method of test generation for testing computer software, comprising the steps of:
responsively to a specification of a software application being verified, modeling said software application as a finite state machine to define a behavioral model of said software application;
associating said behavioral model with a focus, said focus having a reference to said behavioral model, and having at least one directive;

responsively to said directive, deriving an abstract test suite for verification of said software application from said behavioral model and said focus, wherein said abstract test suite complies with a test constraint that is encoded in said focus;

executing said abstract test suite in an execution engine.

30. The method according to claim 29, wherein said step of executing said abstract test suite comprises the step of generating a test script from said abstract test suite; wherein said test script is executed in said execution engine.

31. The method according to claim 29, wherein said step of producing said abstract test suite is performed with a testing interface.

32. The method according to claim 31, wherein said testing interface comprises an abstract-to-concrete translation table.

33. The method according to claim 29, wherein said testing interface comprises a test driver, having an operator interface, and further comprising the step of:

varying parameters of said test driver via said operator interface in accordance with requirements of said software application.

34. The method according to claim 29, wherein said directive comprises a model independent directive.

35. The method according to claim 29, wherein said directive comprises a model dependent directive, and a coverage variable of said behavioral model is tagged by a tag of said model dependent directive, said coverage variable having allowable values.

36. The method according to claim 35, wherein said abstract test suite references said coverage variable, and said step of generating is performed until said coverage variable has assumed each of said allowable values.

37. The method according to claim 36 wherein said coverage variable comprises a plurality of coverage variables, further comprising the step of defining a cross product of said coverage variables, said cross product having members formed by said allowable values of said coverage variables, wherein said step of generating is iterated to produce a plurality of test programs until each of said members is included in at least one of said test programs.

38. The method according to said coverage variable comprises a plurality of coverage variables, further comprising the step of defining an orthogonal array of said coverage variables, said orthogonal array having members formed by said allowable values of said coverage variables, wherein said step of generating is iterated to yield a plurality of test programs until each of said members is included in at least one of said test programs.

39. The method according to claim 35, wherein said directive further comprises a model independent directive.

40. The method according to claim 35, wherein said model dependent directive comprises a plurality of model dependent directives, and said coverage variable is tagged by a plurality of tags of said model dependent directives.

41. The method according to claim 35, wherein said tag is a number-of-tests-per-value tag.

42. The method according to claim 35, wherein said model dependent directive is a mask-value directive.

43. The method according to claim 29, wherein said directive comprises a plurality of directives that are combined to define a directive expression, wherein said step of generating is performed until said directive expression has a predetermined value.

44. The method according to claim 29, wherein said step of modeling is performed by retrieving said behavioral model from a model archive.

45. The method according to claim 29, wherein said step of associating is performed by retrieving said focus from a focus archive.

46. The method according to claim 29, further comprising the steps of comparing state variables of foci of said focus archive with state variables of said behavioral model; and responsive to comparisons resulting from said step of comparing revising selected ones of said foci.

47. The computer software product according to claim 29, wherein said directive comprises a model dependent directive, and a coverage variable of said behavioral model is tagged by a tag of said model dependent directive, said coverage variable having allowable values.

48. The computer software product according to claim 47, wherein said coverage variable comprises a plurality of coverage variables, further comprising the step of defining a cross product of said coverage variables, said cross product having members formed by said allowable values of said coverage variables, wherein said step of generating is iterated to produce a plurality of test programs until each of said members is included in at least one of said test programs.

49. The computer software product according to claim 47, wherein said coverage variable comprises a plurality of coverage variables, further comprising the step of defining an orthogonal array of said coverage variables, said orthogonal array having members formed by said allowable values of said coverage variables, wherein said step of generating is iterated to yield a plurality of test programs until each of said members is included in at least one of said test programs.

50. The computer software product according to claim 47, wherein said abstract test suite references said coverage variable, and said step of generating is performed until said coverage variable has assumed each of said allowable values.

51. The computer software product according to claim 47, wherein said directive further comprises a model independent directive.

52. The computer software product according to claim 47, wherein said model dependent directive comprises a plurality of model dependent directives, and said coverage variable is tagged by a plurality of tags of said model dependent directives.

53. The computer software product according to claim 52, wherein said tags comprise a number-of-tests-per-value tag.

54. The computer software product according to claim 52, wherein said model dependent directive comprise a mask-value directive.

55. A computer software product for testing computer software, comprising a computer-readable medium in which computer program instructions are stored, which instructions, when read by a computer, cause the computer to perform the steps of;

associating a behavioral model of a software application being verified with a focus, said focus having a reference to said behavioral model, and having at least one directive, wherein said behavioral model is created responsively to a specification of said software application, and said behavioral model comprises a finite state machine;

responsively to said directive deriving an abstract test suite for verification of said software application from said behavioral model and said focus, wherein said abstract test suite complies with a test constraint that is encoded in said focus; executing said abstract test suite in an execution engine.

56. The computer software product according to claim 55, wherein said step of
executing said abstract test suite comprises the step of generating a test script from said abstract test suite; wherein said test script is executed in said execution engine.

57. The computer software product according to claim 55, wherein said step of producing said abstract test suite is performed with a testing interface.

58. The computer software product according to claim 57, wherein said testing interface comprises an abstract-to-concrete translation table.

59. The computer software product according to claim 57, wherein said testing interface comprises a test driver, having an operator interface, and further comprising the step of:
varying parameters of said test driver via said operator interface in accordance with requirements of said software application.

60. The computer software product according to claim 55, wherein said directive comprises a model independent directive.

61. The computer software product according claim 55, wherein said directive comprises a plurality of directives that are combined to define a directive expression, wherein said step of generating is performed until said directive expression has a predetermined value.

62. The computer software product according to claim 55, wherein said step of modeling is performed by retrieving said behavioral model from a model archive.

63. The computer software product according to claim 55, wherein said step of associating is performed by retrieving said focus from a focus archive.

64. The computer software product according to claim 63, further comprising the steps of comparing state variables of foci of said focus archive with state variables of said behavioral model; and
responsive to comparisons resulting from said step of comparing revising selected ones of said foci.

65. A computer system for testing computer software, comprising:
a user interface for creating a behavioral model of a software application begin verified, responsively to a specification of said software application, said behavioral model representing a finite state machine, wherein said user interface creates a focus, said focus having a reference to said behavioral model, and having at least one directive;
a compiler, for converting said behavioral model into an intermediate encoding thereof;
a test generator, accepting said intermediate encoding and said focus as input, and responsively to said directive producing an abstract test suite for verifying said software application;
an execution engine for executing a test program of said abstract test suite.

66. The system according to claim 65, wherein said execution engine produces a suite execution trace.

67. The system according to claim 66, further comprising an analyzer which reads said suite execution trace, wherein said execution engine accepts an output of said analyzer.

68. The system according to claim 65, further comprising a visualizer for visualizing an output of said execution engine.

69. The system according to claim 65, wherein said execution engine further receives input from an application model interface that is created by said user interface.

70. The system according to claim 65, wherein said directive comprises a model independent directive.

71. The system according to claim 65, wherein said directive comprises a model dependent directive, and a coverage variable of said behavioral model is tagged by a tag of said model dependent directive, said coverage variable having allowable values.

72. The system according to claim 71, wherein said directive further comprises a model independent directive.

73. The system according to claim 71, wherein said test program references said coverage variable, and said test generator operates until said coverage variable has assumed each of said allowable values.

74. The system according to claim 73, wherein said coverage variable comprises a plurality of coverage variables, and said test generator is operative on an cross product of said coverage variables, said cross product having members formed by said allowable values of said coverage variables, wherein said test generator produces a plurality of test programs and each of said members is included in at least one of said test programs.

75. The system according to claim 73, wherein said coverage variable comprises a plurality of coverage variables, and said test generator is operative on an orthogonal array of said coverage variables, said orthogonal array having members formed by said allowable values of said coverage variables, wherein said test generator produces a plurality of test programs and each of said members is included in at least one of said test programs.

76. The system according to claim 71, wherein said model dependent directive comprises a plurality of model dependent directives, and said coverage variable is tagged by a plurality of tags of said model dependent directives.

77. The system according to claim 71, wherein said tag is a number-of-tests-per-value tag.

78. The system according to claim 71, wherein said model dependent directive is a mask-value directive.

79. The system according to claim 65, wherein said directive comprises a plurality of directives that are combined to define a directive expression, wherein said execution engine executes until said directive expression has a predetermined value.

80. The system according to claim 65, further comprising a model archive that is accessed by said user interface.

81. The system according to claim 65, further comprising a focus archive that is accessed by said user interface.

* * * * *